United States Patent [19]
Mizuno et al.

[11] Patent Number: 5,790,503
[45] Date of Patent: Aug. 4, 1998

[54] OPTICAL HEAD

[75] Inventors: Sadao Mizuno, Ibaraki; Tsuguhiro Korenaga; Shinji Uchida, both of Neyagawa, all of Japan

[73] Assignee: Matsushita Electric Industrial Co., Ltd., Osaka, Japan

[21] Appl. No.: 755,405

[22] Filed: Nov. 22, 1996

[30] Foreign Application Priority Data

Nov. 22, 1995 [JP] Japan ................................ 7-304108
Dec. 18, 1995 [JP] Japan ................................ 7-328605

[51] Int. Cl.⁶ ........................................ G11B 7/00
[52] U.S. Cl. ................................. 369/112; 369/110
[58] Field of Search ........................ 369/100, 103, 369/109, 110, 112, 13, 47, 48, 50, 54, 58

[56] References Cited

U.S. PATENT DOCUMENTS 5,467,336  11/1995  Ando et al. ........................... 369/112
5,513,164   4/1996  Tanaka et al. ......................... 369/112

*Primary Examiner*—Paul W. Huber
*Attorney, Agent, or Firm*—Ratner & Prestia

[57] ABSTRACT

An optical head has a light source, luminous flux splitting means for splitting radiation luminous flux of linearly polarized light radiated from the light source into plural luminous fluxes, a wavelength plate for polarizing at least one of the luminous fluxes split by the luminous flux splitting means into a nearly circularly polarized light as illumination luminous flux, an objective lens for converging the illumination luminous flux on an optical information medium and collecting the reflected light, and a photo detector for receiving the reflected luminous flux, after passing through the wavelength plate and the luminous flux splitting means, wherein supposing a power efficiency when splitting the illumination luminous flux from the radiation luminous flux to be E1, a power efficiency when transmitting a polarized light component of the reflected luminous flux, the component being orthogonal to a direction of polarization of the illumination luminous flux, to the photo detector to be E2, and a power efficiency when transmitting a polarized light component of the reflected luminous flux, the component having substantially same direction as a direction of polarization of the illumination luminous flux, to the photo detector to be E3, the E2 is larger than the E1 and the E1×E3 is such amount that can be detected by the photo detector.

26 Claims, 15 Drawing Sheets

OPTICAL HEAD

BACKGROUND OF THE INVENTION

1. Industrial Field of the Invention

The present invention relates to an optical head of an optical disk apparatus for recording or reproducing information optically in an optical disk.

2. Related art of the Invention

The objective lens used in an optical head is designed in consideration of the thickness of an optical disk, and in an optical disk having a thickness different from the design value, spherical aberration occurs and the converging performance deteriorates, making recording or reproducing difficult. Hitherto, the compact disc (CD), video disc and magneto-optical disk for data were all same in the thickness of 1.2 mm. It was hence possible to record and reproduce different types of optical disks by one optical head.

Recently, however, in order to heighten the density of optical disk, it has been studied to increase the number of apertures of the objective lens. When the number of apertures of the objective lens is increased, the optical resolution is improved, and the frequency band for recording and reproducing can be expanded, but if there is an inclination in optical disk, coma aberration increases. Due to warp of the optical disk and inclination of mounting the optical disk, the optical disk has an inclination toward the objective lens, and coma aberration occurs in the converged light spot. Because of this coma aberration, if the number of apertures is increased, the converging performance is not improved. Accordingly, in order to prevent the coma aberration from increasing by increasing the number of apertures of the objective lens, it is attempted to heighten the density by reducing the thickness of the optical disk to 0.6 mm. When the thickness of the optical disk is reduced, however, a conventional optical disk cannot be reproduced by the objective lens for recording and reproducing this optical disk, and compatibility with the conventional optical disk is not assured.

To solve this problem, a bifocal optical head as shown in FIG. 24 is proposed. In FIG. 24, the radiation luminous flux emitted from a semiconductor laser 41 is collected by a collect lens 42 to be parallel light beam 43. This light beam 43 enters a polarized light beam splitter 44 as P polarized light. Hence, the light beam entering the polarized light beam splitter 44 almost completely passes through it, and is transformed into a nearly circularly polarized light by a quarter wavelength plate 45, and enters an objective lens 7 as the optical path is bent by a reflection mirror 46. A hologram 8 is formed on the inner circumference of the incident plane of the objective lens 7. This hologram is a blazed hologram, and higher order diffracted light can be suppressed. Accordingly, the light passing through the hologram 8 is divided into a primary diffracted light mainly diffracted by this hologram 8 and order 0 Diffracted light not affected by diffraction. The primary diffracted light forms a light spot 9a focussed by the objective lens 7, and the order 0 diffracted light forms a light spot 9b focussed by the objective lens 7, together with the light passing through the outer circumference of the incident plane of the objective lens 7,on which hologram 8 is not formed. The light spot 9a is for reproducing an optical disk 10a of 1.2 mm in thickness, and the light spot 9b is for reproducing an optical disk 10b of 0.6 mm in thickness. FIG. 25A shows the state of converging the optical spot 9a on the information recording medium surface of the optical disk 10a, and FIG. 25B shows the state of converging the optical spot 9b on the information recording medium surface of the optical disk 10b. When reproducing the optical disk 10a of 1.2 mm in thickness, it is controlled so that the light spot 9a may be formed on the recording medium surface of the optical disk 10a, and reproducing the optical disk 10b of 0.6 mm in thickness, it is controlled so that the light spot 9b may be formed on the recording medium surface of the optical disk 10b. In this way, optical disks 10a, 10b differing in thickness can be recorded and reproduced by one objective lens 7. Incidentally, FIG. 24 shows the state of converging the light spot 9a on the optical disk 10a. Reflected light 47a or 47b (47b is not shown) reflected from the optical disk 10a or 10b passes again through the objective lens 7, hologram 8, reflection mirror 46, and quarter wavelength plate 45, and enters the polarized light beam splitter 44. If the optical disk is free from birefringence, the reflected light 47a or 47b becomes an S polarized light by the action of the quarter wavelength plate 45, and is reflected by the polarized light beam splitter 44, passes through an iris lens 48 and a cylindrical lens 49, and is received by a photo detector 50. The photo detector 50 is designed to detect the reproduced signal, and also detect the focus control signal by astigmatism method and the tracking control signal by phase difference method.

In this constitution, the 0.6 mm thick optical disk 10b is, for example, a high density optical disk, and is manufactured to be small in birefringence. This high density optical disk includes a two-layer disk type for reproducing two sides from one side through a layer of scores of microns, and it requires a greater quantity of light than CD reproduction of one side only because the quantity of reflected light declines. Moreover, to keep the S/N ratio in high frequency region, it is hard to decrease the quantity of light. Accordingly, in the optical head used in high density optical disk, a polarized light beam splitter is used in separation of reflected light and illumination light, and the loss of quantity of light due to separation is kept to a minimum. On the other hand, the 1.2 mm thick optical disk 10a is, for example, a CD, and those having a large birefringence over the standard are sold on market. In the CD not requiring such large quantity of light as in the high density optical disk, a half mirror is used for separation of reflected light and illumination light, and the loss of quantity of light due to separation is large, but it is not affected by birefringence, and therefore it is possible to cope with the optical disk 10a of large birefringence over the standard. In the common optical head for reproducing both high density optical disk and CD by one optical head, there is a contradictory problem between keeping of a sufficient quantity of light for high density optical disk and coping with a large birefringence for CD. So far, however, there is no optical disk capable of sufficiently solving this contradictory problem, and the polarized light beam splitter is used in the prior art, and when the birefringence of the optical disk 10a is large, most of the reflected light 47a passes through the polarized beam splitter 44, and the quantity of light reaching the photo detector 50 is lowered, and thereby reproduction is difficult.

In such conventional constitution, since the light from the light source and the reflected light from the optical disk are separated by using a polarized light beam splitter, it cannot cope with an optical disk large in birefringence. In particular, the CD has a large birefringence, and it may reach nearly half wavelength in commercial products. If the optical disk has no birefringence, the reflected light 47a or 47b enters the polarized light beam splitter 44 as S polarized light due to the action of the quarter wavelength plate, but if the optical disk has a birefringence of half wavelength, the reflected light 47a or 47b enters the polarized light beam splitter 44 as P polarized light, and it passes through to be fed back to the semiconductor laser 41. As a result, the reflected light does not reach the photo detector 50, and cannot be reproduced. If the birefringence of the optical disk is not as large as ½ wavelength, if very large, the quantity of light reaching the photo detector 50 is extremely lowered, and reproduction is difficult. Accordingly, the optical head for general CD is designed to separate the light from the light source and the reflected light from the optical disk by a half mirror. In the high density optical disk, however, in order to enhance the converging performance, the light beam 43 is increased in the ratio of light intensity in the surrounding to the light density in the center, and the light intake rate is small, and further due to drop of quantity of reflected light by two-layer disk and to keep the quantity of light for improvement of S/N ratio of high frequency components, it is hard to use the half mirror. Or, as in the prior art, in the separation by polarization using polarized light beam splitter, it cannot cope with the optical disk of large birefringence as mentioned above.

SUMMARY OF THE INVENTION

For solving the problem of the prior art, an optical head of the present invention comprises, light source, luminous flux splitting means for splitting radiation luminous flux of linearly polarized light radiated from the light source into plural luminous fluxes without changing the luminous flux diameter substantially, a wavelength plate for polarizing at least one of the luminous fluxes split by the luminous flux splitting means into a nearly circularly polarized light as illumination luminous flux, an objective lens for converging the illumination luminous flux through the wavelength plate on an optical information medium and collecting the reflected light, and a photo detector for receiving the reflected luminous flux collected by the objective lens, after passing through the wavelength plate and the luminous flux splitting means, wherein supposing a power efficiency when splitting the illumination luminous flux from the radiation luminous flux to be E1, a power efficiency when transmitting a polarized light component of the reflected luminous flux, the component being orthogonal to a direction of polarization of the illumination luminous flux, to the photo detector to be E2, and a power efficiency when transmitting a polarized light component of the reflected luminous flux, the component having substantially same direction as a direction of polarization of the illumination luminous flux, to the photo detector to be E3, the E2 is larger than the E1 and the E1×E3 is such amount that can be detected by the photo detector.

Thus, by composing the luminous flux splitting means by splitting the light in the same direction of polarization as the light from the light source at a specific rate, and transmitting the light in the direction of polarization orthogonal to the light from the light source almost completely to the photo detector, if the birefringence of the optical disk is half wavelength, the photo detector can receive the light. That is, by combination of birefringence of quarter wavelength plate and optical disk, if the light from the light source and the reflected light from the optical disk are same in the direction of polarization, the luminous flux splitting means can transmit the light to the photo detector. Moreover, when the birefringence is small as in the case of high density optical disk, almost all reflected light from the optical disk can be received in the photo detector, and therefore the reflected light reaching the photo detector is not reduced to half as in the case of using the half mirror, and the light utilization efficiency may be enhanced.

Figure 1:
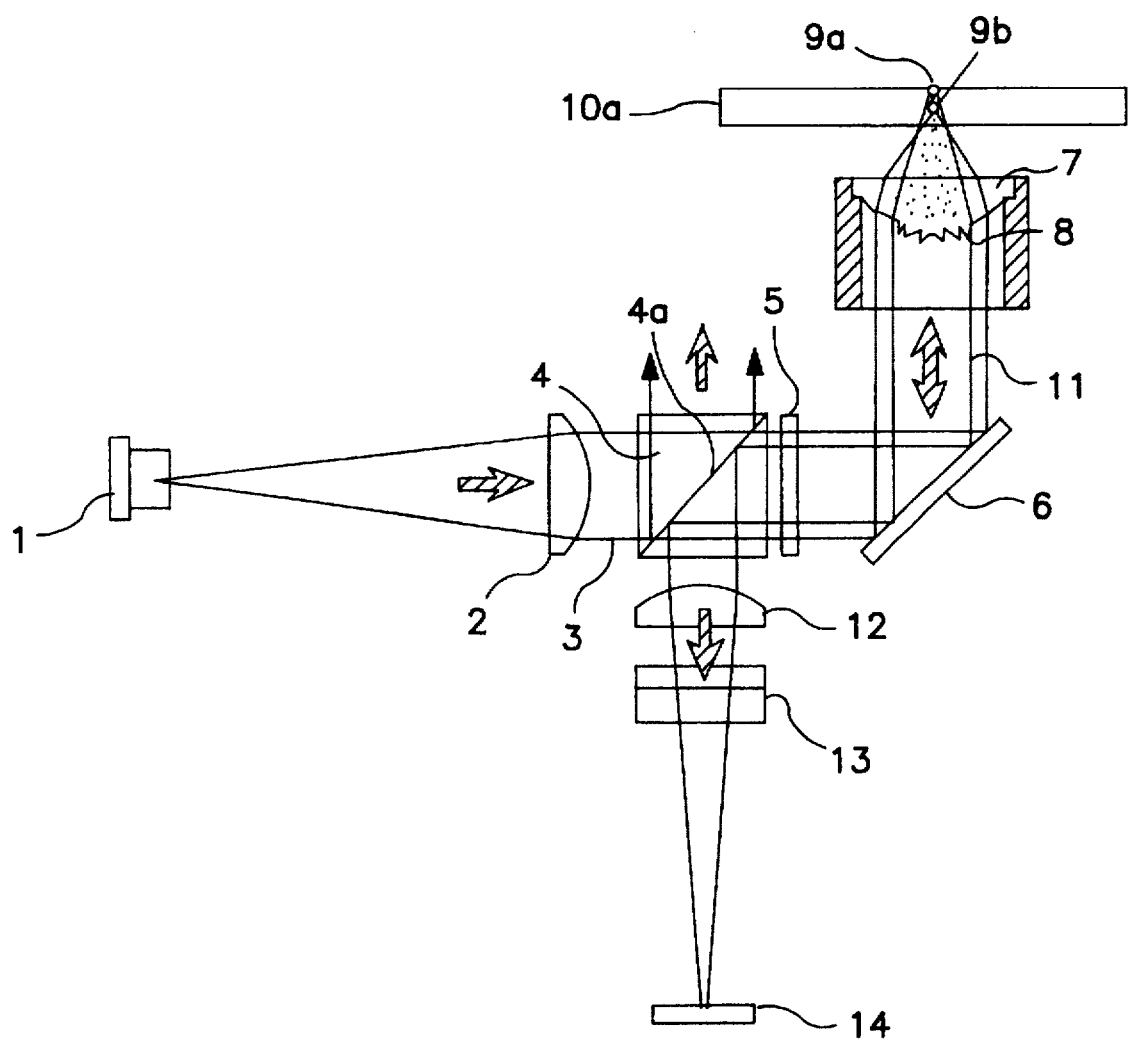
FIG. 1 is a diagram showing a constitution of embodiment 1 of an optical head of the invention.

1 Semiconductor laser
2 Condenser lens
3 Light beam
4 Beam splitter
4a Optical film surface
5 Quarter wavelength plate
7 Objective lens
8 Hologram
9a Light spot
9b Light spot
10a a Optical disk
10b Optical disk
11a a Reflected light
11b Reflected light
14 Photo detector

PREFERRED EMBODIMENTS (Embodiment 1)

Figure 2:
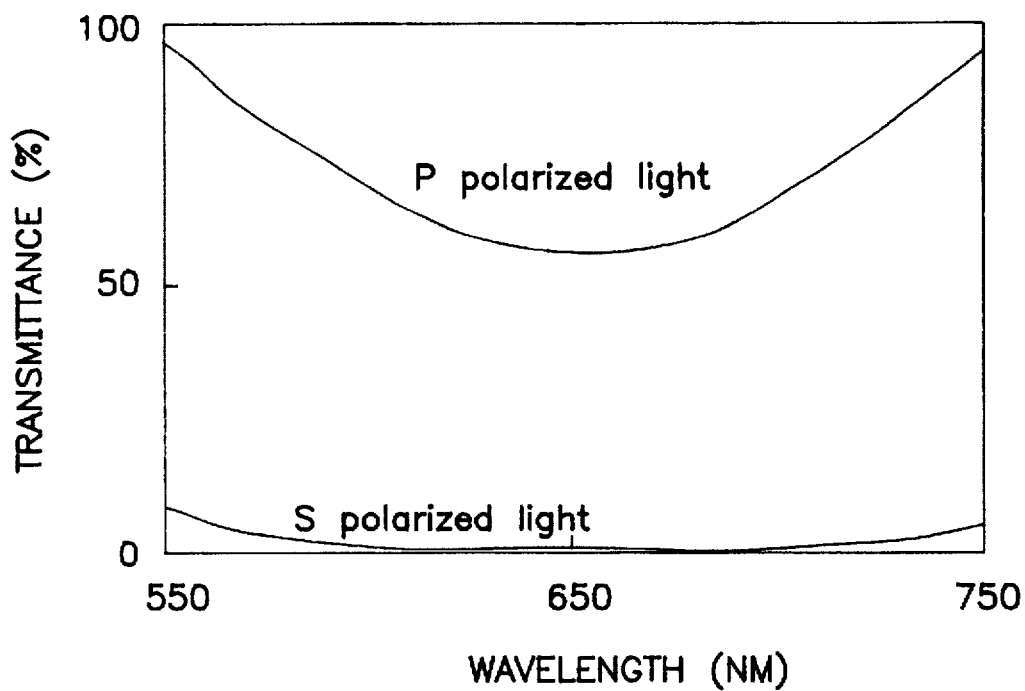
FIG. 2 is a diagram showing the characteristic of a beam splitter in embodiment 1 of the invention.
Figure 25A:
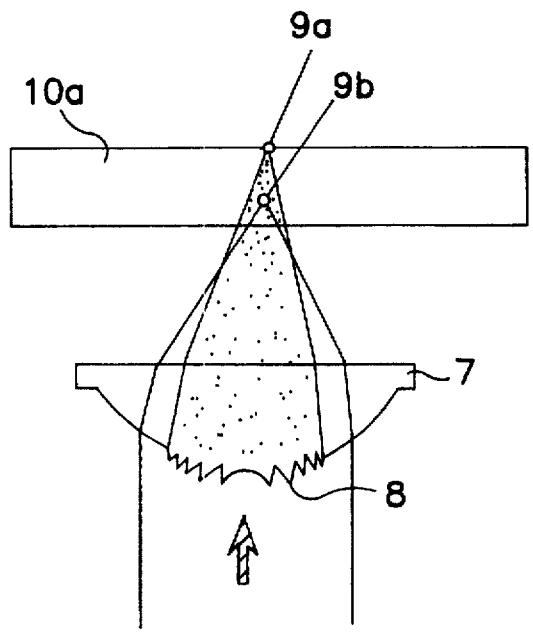
FIGS. 25A, 25B are explanatory diagrams of thickness of optical disk and light spot.
Figure 25B:
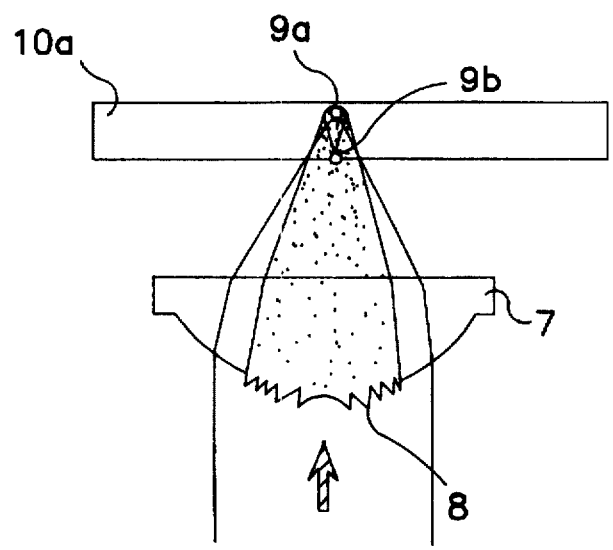

An embodiment of the invention is described by referring to FIG. 1. In FIG. 1, same reference numerals as in the prior art function alike. A radiation luminous flux emitted from a semiconductor laser 1 is collected by a collect lens 2 to be a parallel light beam 3, and enters a beam splitter 4 which is luminous flux splitting means as P polarized light. The beam splitter 4 forms an optical film surface 4a for passing P polarized light at power efficiency E1 and reflecting at power efficiency (1−E1), and reflecting S polarized light at power efficiency E2, assuming there is no power loss due to the splitting. In this embodiment, as shown in FIG. 2, the optical film surface 4a is an optical film having such characteristic as E1 of about 60% and E2 of nearly 100%. Therefore, 60% of the light beam 3 of P polarized light entering herein passes through it, and runs through a quarter wavelength plate 5 which transforms into a nearly circularly polarized light by defining a phase difference of quarter wavelength between ordinary light and extraordinary light, and enters an objective lens 7 after the optical path is bent by a reflection mirror 6. The objective lens 7 is same in constitution as in the prior art, and a blazed hologram 8 is formed on the inner circumference of the incident plane of the objective lens 7. The light passing through this hologram 8 is mainly divided into primary diffracted light and order 0 diffracted light, and the primary diffracted light is focussed by the objective lens 7 to form a light spot 9a, while the order 0 diffracted light is focussed by the objective lens 7 to form a light spot 9b together with the light on the outer circumference of the incident plane of the lens 7 on which hologram is not formed. The light spot 9a is for reproducing a 1.2 mm thick optical disk 10a, and the light spot 9b is for recording and reproducing a 0.6 mm thick optical disk 10b (not shown). FIG. 1 shows the converged state of the light spot 9a on the information recording medium surface of the optical disk 10a. As shown in FIG. 25A, when reproducing the 1.2 mm thick optical disk 10a, it is controlled so that the light spot 9a may be formed on the recording medium surface of the optical disk 10a, and when recording or reproducing the 0.6 mm thick optical disk 10b, as shown in FIG. 25B, it is controlled so that the light spot 9b may be formed on the recording medium surface of the optical disk 10b. Thus, the optical disks 10a, 10b differing in thickness can be recorded and reproduced by one objective lens.

Consequently, the reflected light 11a or 11b reflected from the optical disk 10a or 10b passes again through the objective lens 7, hologram 8, reflection mirror 6 and quarter wavelength plate 5, and enters the beam splitter 4. If the optical disk is free from birefringence, the reflected light 11a, 11b becomes an S polarized light by the action of the quarter wavelength plate 5, and is reflected by the beam splitter 4, and passes through an iris lens 12 and a cylindrical lens 13, and is received by a photo detector 14. The photo detector 14 is designed to detect the reproduced signal, and also detect the focus control signal by astigmatism method and the tracking control signal by phase difference method.

The invention is thus constituted, and a reproduction output can be obtained if there is a large birefringence in the optical disk 10a. For example, if the optical disk 10a has a birefringence of half wavelength, the direction of polarization of the reflected light 11a is a P polarized wave by the combining action with the quarter wavelength plate 5, and enters the beam splitter 4. In the beam splitter 4, since the optical film having the characteristic as shown in FIG. 2 is formed on the optical film surface 4a, 40% is reflected, and is received by the photo detector 14. Accordingly, although the reproduction output is lowered, a sufficient reproduced signal can be obtained. Lowering of the quantity of received light by birefringence of the optical disk 10a is maximum at half wavelength, and the reflection of the beam splitter 4 does not become smaller than 40%. If there is no birefringence in the optical disk 10b, the reflected light 11b is an S polarized light, and enters the beam splitter 4, and the majority is reflected by the characteristic of the optical film as shown in FIG. 2, and is received by the photo detector 14.

In the beam splitter 4, in this way, when the P polarized light is passed at power efficiency E1, since there is almost no power loss due to splitting on the optical film surface 4a composed of a dielectric multi-layer film, the reflection of P polarized light is at the power efficiency of (1−E1). As the birefringence of the optical disk 10a, supposing the phase difference of the advancing axis and retarding axis to be $2\phi°$, and the light transmission rate of beam splitter 4 to be $\eta$, when the light transmission rate $\eta$ is expressed by the product of the rate of transmitting the light from the light source to the optical disk and the rate of transmitting the reflected light from the optical disk to the photo detector, it follows that $\eta = SQR\ ((E1 \times E2 \times \cos\phi)^2 + (E1 \times (1-E1) \times \sin\phi)^2)$ where SQR is the square root.

In this formula, in the absence of birefringence, since $\phi=0$, the light transmission rate $\eta 1$ is $E1 \times E2$, and at the birefringence of 180°, since $\phi=90°$, the light transmission rate $\eta 2$ is $E1 \times (1-E1)$. It is when both E1 and E2 are 1 that $\eta 1$ is the maximum, and it is when E2 is 0.5 that $\eta 2$ is the maximum, and hence E2 is 1, and E1 is 0.5 or more and 1 or less. In this embodiment, E1 is 0.6, and E2 is 1.

Some of the compact discs may have a very large birefringence over the standard, but by forming the beam splitter 4 having an optical film as shown in FIG. 2, a sufficient reproduction output can be obtained, and a sufficient quantity of light for assuring the S/N ratio can be obtained in the optical disk 10b fabricated at small birefringence as in the case of high density optical disk. Hence, the problems of lowering of quantity of light when using half mirror and birefringence by using polarized light beam splitter can be solved.

(Embodiment 2)

Figure 4:
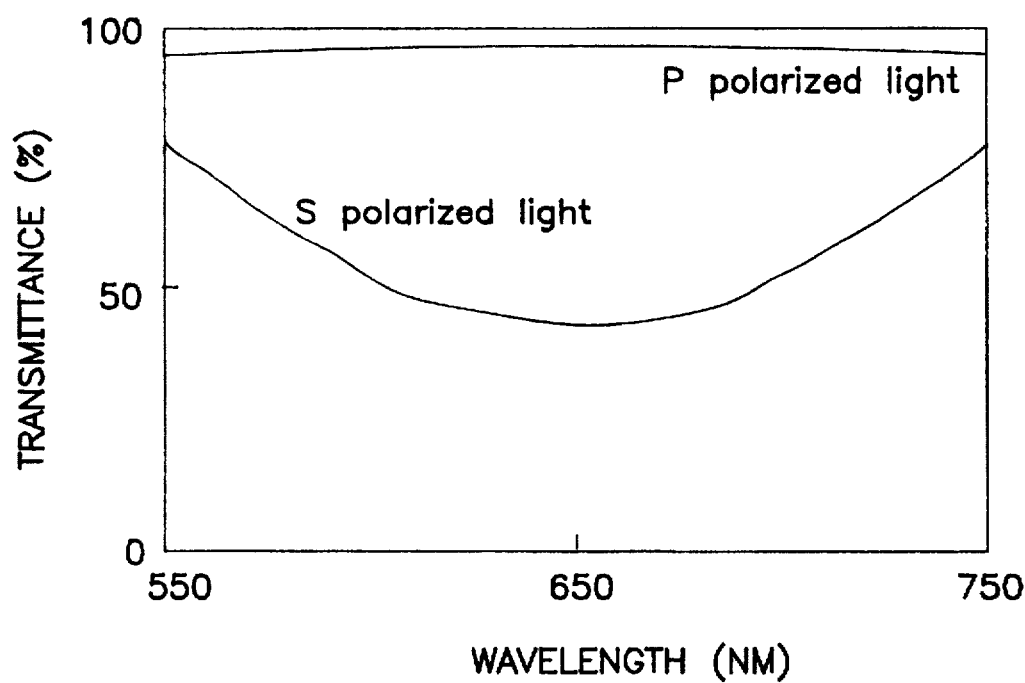
FIG. 4 is a diagram showing the characteristic of a beam splitter in embodiment 2 of the invention.
Figure 3:
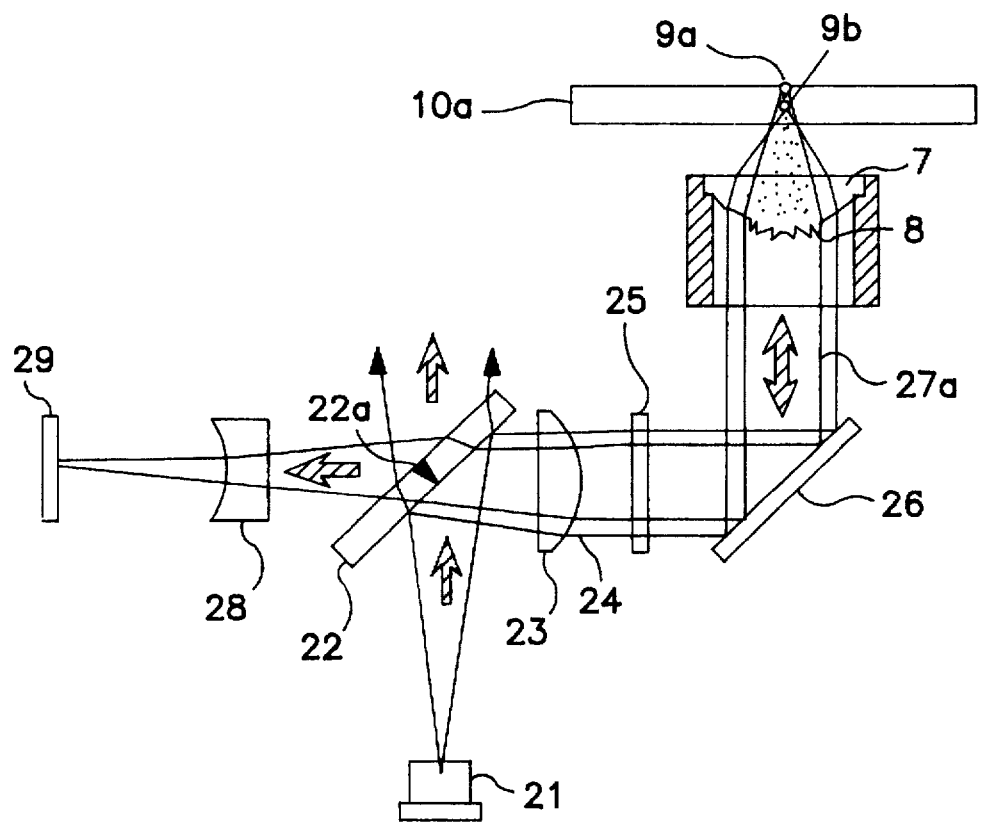
FIG. 3 is a diagram showing a constitution of embodiment 2 of an optical head of the invention.

Other embodiment of the invention is described in FIG. 3. In FIG. 3, the light emitted from a semiconductor laser 21 enters a beam splitter 22 which is luminous flux splitting means as an S polarized wave. The beam splitter 22 forms an optical film surface 22a for reflecting S polarized light at power efficiency E1 and passing at power efficiency (1−E1), and passing P polarized light at power efficiency E2, assuming there is no power loss due to splitting. In this embodiment, as shown in FIG. 4, the optical film surface 22a is an optical film having such characteristic as E1 of about 60% and E2 of about 90%. Therefore, the light from the light source is reflected by 60%, and is collected in a collect lens 23 to be a light beam 24. The others are same as in the preceding embodiment shown in FIG. 1, and two spots 9a, 9b are formed through quarter wavelength plate 25, reflection mirror 26, hologram 8, and objective lens 7. As shown in FIG. 25A and FIG. 25B, when reproducing the 1.2 mm thick optical disk 10a, it is controlled so that the light spot 9a may be formed on the recording medium surface of the optical disk 10a, and when recording or reproducing the 0.6 mm thick optical disk 10b, it is controlled so that the light spot 9b may be formed on the recording medium surface of the optical disk 10b. Therefore, the optical disks 10a, 10b different in thickness can be recorded and reproduced by one objective lens. Reflected light 27a reflected from the optical disk 10a passes again through the objective lens 7, hologram 8, reflection mirror 26 and quarter wavelength plate 25, and enters the beam splitter 22. This reflected light 27a is transformed into a P polarized light by the action of the quarter wavelength plate 25, and passes through the beam splitter 2 to receive a lens action of a concave lens 28, and is received by a detector 29. In this case, if the optical disk 10a has a birefringence of half wavelength, the reflected light 27a becomes an S polarized light, and enters the beam splitter 22, but since the optical film surface 22a is coated with an optical film with the characteristic as shown in FIG. 4, 40% is passed and received by the photo detector 29, so that a sufficient reproduced signal is obtained same as in the preceding embodiment. Besides, if the optical disk 10b as no birefringence, the reflected light 27b becomes a P polarized light, and enters the beam splitter 22, and about 90% is passed and received by the photo detector 29 due to the characteristic of the optical film as shown in FIG. 4. In the embodiment, the beam splitter is designed to transmit 60% of the light from the light source, but a practical quantity of light can be maintained if somewhere between 50% and 80%.

(Embodiment 3)

The above two embodiments are examples of luminous flux splitting means by optical multi-layer film, and the luminous flux splitting means can be composed by a polarizing hologram. The polarizing hologram is a hologram differing in the diffraction efficiency depending on the direction of polarization, and when applied to the invention, this hologram is composed so as to split the radiation luminous flux from the light source into illumination luminous flux at power efficiency E1, and transmit the polarized light component orthogonal to the radiation luminous flux of the reflected luminous flux from the optical disk to the photo detector at power efficiency E2 and transmit the polarized light component having same direction as the direction of the radiation luminous flux of the reflected luminous flux, from the optical disk to the photo detector at power efficiency E3. This hologram has a loss of quantity of light due to diffraction, and supposing this loss rate to be L, the power efficiency of transmitting the polarized light component in the same direction as the light source out of the reflected luminous flux from the optical disk to the photo detector is E3=(1−E1−L), and the power efficiency E1 of transmitting the polarized light component orthogonal to the light source out of the reflected light to the photo detector is smaller than 1.

(Embodiment 4)

In the following embodiments, a beam splitter composed of various optical multi-layer films is used as luminous flux splitting means, and the specific film composition of the beam splitter, and the fabricating method are described.

For the optical film of beam splitter, a considerably severe specification is demanded.

In the aspect of performance, in the first place, wavelength fluctuations are about ±20 nm in the semiconductor laser of the optical head, and it is required that there is a same performance in a wide wavelength range. In particular, in the flat plate type beam splitter shown in FIG. 3, since non-parallel light enters, a same performance is needed in a further wider wavelength range. In addition, the efficiency is required to be as high as possible, that is, a greater quantity of light should be fed back to the photo detector. The higher the efficiency, the more can be lowered the output of the semiconductor laser, which leads to extension of the laser life.

As its reliability, the optical film is required to maintain the performance for a long period without deterioration. The film material must be stable in any environments, the film adhesion should be sufficient, and in particular considering the optical head is mainly used in consumer products, the film material and substrate must be harmless.

Moreover, for mass production, the structure should be simple, the number of layers must be as small as possible, and it must be designed to be easy to manufacture.

As the optical film of beam splitter, it was indispensable to find the material satisfying these strict required specification.

A fabricating method of the beam splitter is described in the first place.

A glass substrate (refractive index 1.51) was heated in a vacuum deposition apparatus to 300° C., and when the degree of vacuum reached $5\times10^{-6}$ Torr, oxygen gas was fed into the apparatus through a pressure controller, the degree of vacuum was set at $1.5\times10^{-4}$ Torr, and $TiO_2$ (refractive index 2.30) was evaporated by an electron gun to an optical film thickness λ (λ is a quarter of design wavelength 662 nm). Then, in order to form an antireflection film (AR film) on the back side, the substrate was inverted while keeping vacuum, a first layer of $MgF_2$ (refractive index 1.38) was formed by evaporation, and then a second layer of $Al_2O_3$ (refractive index 1.62) and a third layer of $MgF_2$ film, successively by introducing oxygen gas into the apparatus through a pressure controller and keeping the degree of vacuum at $8\times10^{-5}$ Torr. Each layer was set at the optical film thickness as shown in Table 1. After releasing to the atmosphere, the substrate was taken out and cut, and samples were prepared.

TABLE 1

| | Material | Refractive index | Optical film thickness |
|---|---|---|---|
| Layer 1 | $MgF_2$ | 1.38 | 1.36λ |
| Layer 2 | $Al_2O_3$ | 1.62 | 1.11λ |
| Layer 3 | $MgF_2$ | 1.38 | 0.87λ |

λ = 662 / 4 nm

Figure 5:
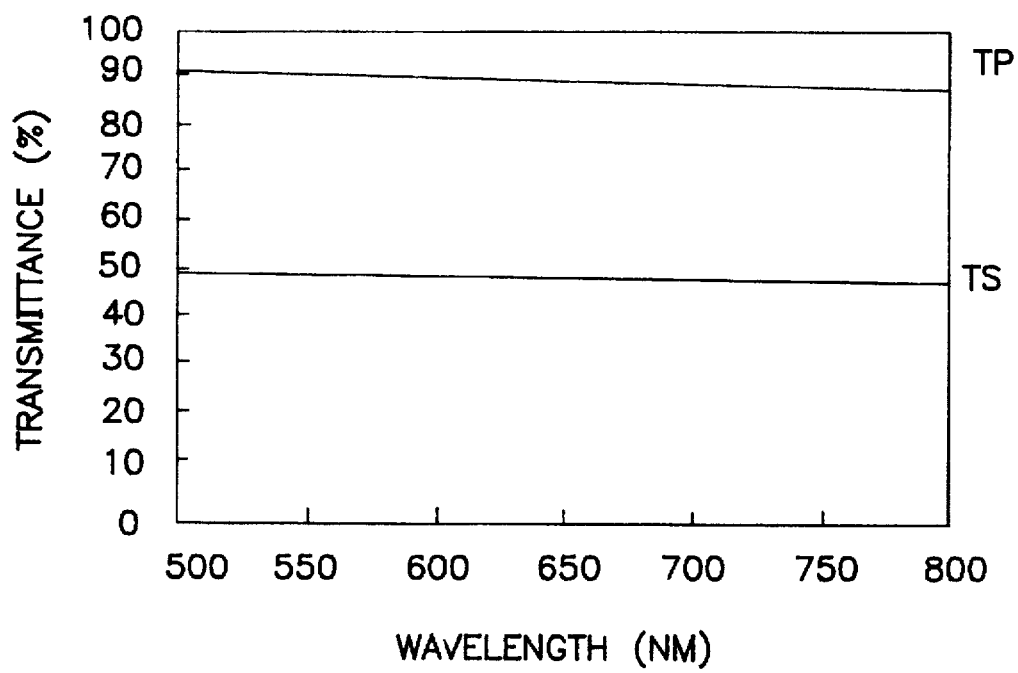
FIG. 5 is a diagram showing the transmittance characteristic of a beam splitter in embodiment 4 of the invention.

The transmission characteristics of obtained samples are shown in FIG. 5. The characteristics were measured at incident angle of 55°, in the configuration of the light entering from the $TiO_2$ side and leaving from the AR film. In the diagram, TS and TP refer to the transmittance to S and P polarized light.

Thus was obtained a beam splitter having flat characteristics with S transmittance of 47% (E1 is 0.53) and P transmittance of 90% (E2 is 0.9) in a wide wavelength range centered on the design wavelength 662 nm. It was also confirmed that the absorption can be ignored in the visible region.

Figure 6:
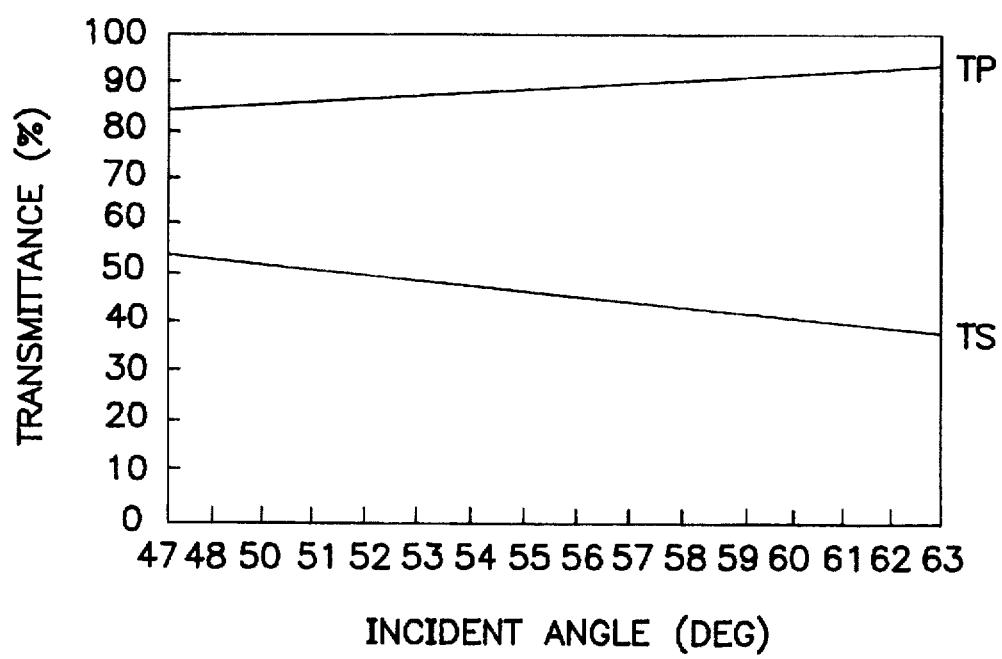
FIG. 6 is a diagram showing the transmittance characteristic to incident angle of the beam splitter in embodiment 4 of the invention.

FIG. 6 shows the transmittance of S polarized light and transmittance of P polarized light in the case of change of incident angle by ±8° from 55°, in the beam splitter of the embodiment at three wavelengths of 642 nm, 662 nm, and 682 nm. It is known from FIG. 6 that the characteristics are almost same at any laser wavelength. This wavelength width of ±20 nm is to allow sufficiently laser wavelength characteristics occurring at the time of laser manufacture or characteristic fluctuations at the time of forming film. Along with the incident angle, the transmittance of S polarized light decreases (the reflectivity increases), and the transmittance of P polarized light increases, and in the disk of small birefringence, therefore, even in the case of non-parallel light entering from the laser, the distribution of quantity of light of the light beam reaching the detector is nearly same as the distribution before incidence of beam splitter.

Incorporating such beam splitter in the optical head in the same constitution as in FIG. 3 and studying, a quantity of light sufficient for maintaining the S/N ratio was obtained (about less than twice that of half mirror) for the disk fabricated at small birefringence such as high density optical disk. On the other hand, in the compact disc having a large birefringence over the standard, a same quantity of light as in the half mirror was obtained, and a sufficient reproduction output was maintained. As for the incident angle around the luminous flux entering the beam splitter from the laser, a sufficiently satisfactory result was obtained at 40° to 60° appropriate for the structure of the optical head.

Incidentally, when the back side coating of the antireflection film was omitted, although the reproduction output was slightly lowered in the compact disc having a large birefringence over the standard, there was no effect on reproduction.

The fabricated samples were presented for heat shock test (holding at 80° C. and −40° C. for 1 hour each, repeating 10 cycles), high temperature and high humidity test (60° C., 90% RH, 1000 hours), low temperature test (−40° C., 1000 hours), tape peel test, and other reliability tests, and changes of optical characteristics and surface observation by optical microscope were investigated before and after tests, but no change was detected.

Thus, the practical optical head completely free from problem in performance and reliability was realized.

The beam splitter of the embodiment is in a simple structure coating an inexpensive glass substrate with a single-layer film, and unlike the beam splitter using prism, it does not require complicated processing, polishing and adhering process. Moreover, in this beam splitter, since changes in transmission characteristics to the wavelength are small as shown in FIG. 5, high precision control of film thickness is not needed in manufacture, and it can be manufactured sufficiently by time control, and the facility can be simplified, and still more the area effective for forming film is wide, and a mass quantity can be produced at once, so that the cost can be reduced substantially.

It can be also applied to other laser wavelength only by changing the film thickness.

In this embodiment, the vacuum deposition is employed as film forming method, but it is not limitative, and, for example, sputtering, CVD or sol-gel method may be also employed.

(Embodiment 5)

An embodiment of optical head using other beam splitter is described below.

First, a fabricating method of beam splitter is described.

A glass substrate (refractive index 1.51) was heated to 300° C. in a vacuum deposition apparatus, and when the degree of vacuum reached $5\times10^{-6}$ Torr, oxygen gas was introduced into the apparatus through a pressure controller to set the degree of vacuum to $1.5\times10^{-4}$ Torr, and a $TiO_2$ film (refractive index 2.30) was evaporated by an electron gun, and successively, with feeding of oxygen gas being stopped, an $SiO_2$ film (refractive index 1.46) was formed, and a $TiO_2$ film in the same condition as above, to the optical film thickness specified in Table 2. Later, while maintaining the vacuum, the substrate was inverted, and the antireflection film in Table 1 was formed in the same manner as in embodiment 4. After releasing to the atmosphere, the substrate was taken out and cut off, and samples were prepared.

TABLE 2

|  | Material | Refractive index | Optical film thickness |
| --- | --- | --- | --- |
| Layer 1 | $TiO_2$ | 2.30 | 1.73λ |
| Layer 2 | $SiO_2$ | 1.46 | 0.82λ |
| Layer 3 | $TiO_2$ | 2.30 | 0.82λ |

λ = 662 / 4 nm

Figure 7:
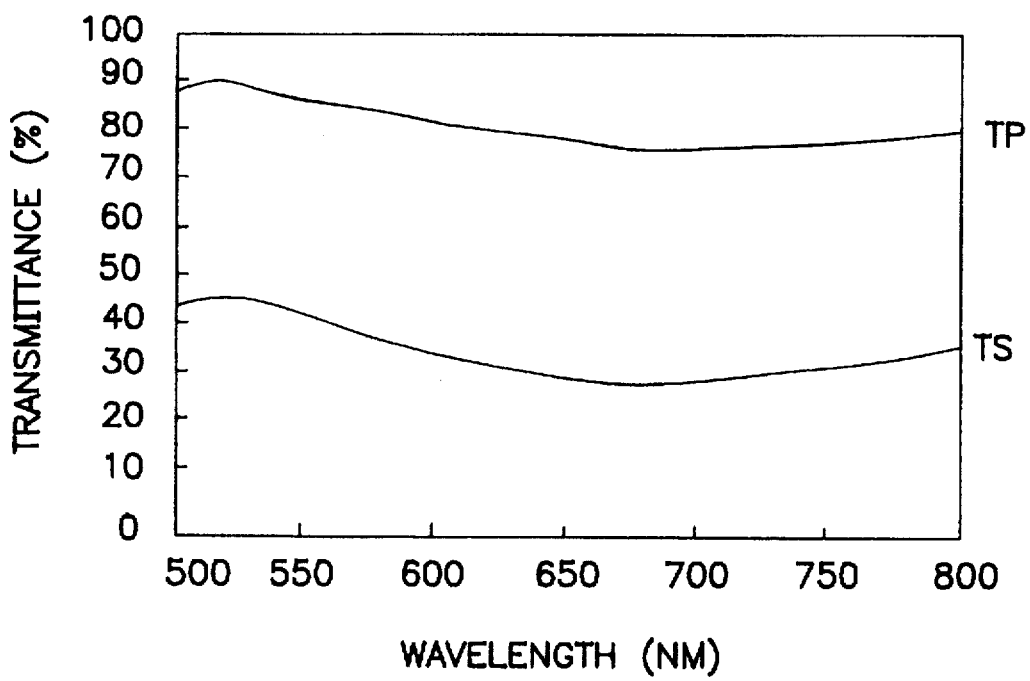
FIG. 7 is a diagram showing the transmittance characteristic of a beam splitter in embodiment 5 of the invention.

The transmission characteristics of obtained samples are shown in FIG. 7. The characteristics were measured at incident angle of 55°, in the configuration of the light entering from the three-layer film side and leaving from the AR film. In the diagram, TS and TP refer to the transmittance to S and P polarized light.

Thus was obtained a beam splitter having flat characteristics with S transmittance of 31% (E1 is 0.69) and P transmittance of 80% (E2 is 0.8) in a wide wavelength range centered on the design wavelength 662 nm. It was also confirmed that the absorption can be ignored in the visible region.

Figure 8:
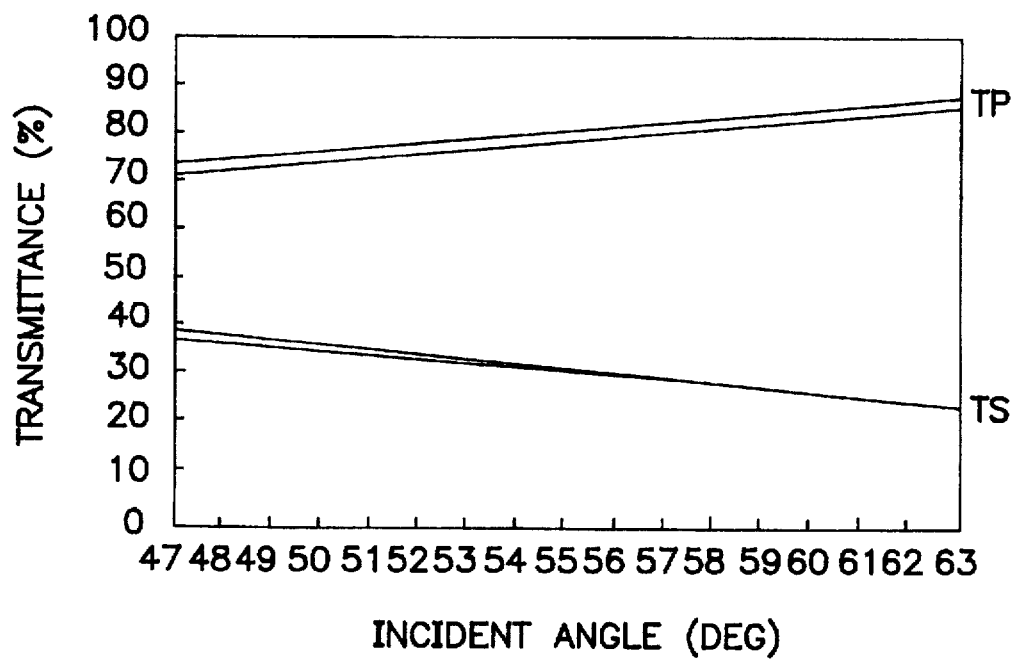
FIG. 8 is a diagram showing the transmittance characteristic to incident angle of the beam splitter in embodiment 5 of the invention.

FIG. 8 shows the transmittance of S polarized light and transmittance of P polarized light in the case of change of incident angle by ±8° from 55°, in the beam splitter of the embodiment at three wavelengths of 642 nm, 662 nm, and 682 nm. It is known from FIG. 8 that the characteristics are almost same at any laser wavelength. This wavelength width of ±20 nm is to allow sufficiently laser wavelength characteristics occurring at the time of laser manufacture or characteristic fluctuations at the time of forming film. Along with the incident angle, the transmittance of S polarized light decreases (the reflectivity increases), and the transmittance of P polarized light increases, and in the disk of small birefringence, therefore, even in the case of non-parallel light entering from the laser, the distribution of quantity of light of the light beam reaching the detector is nearly same as the distribution before incidence of beam splitter.

Incorporating such beam splitter in the optical head in the same constitution as in FIG. 3 and studying, a quantity of light sufficient for maintaining the S/N ratio was obtained (about more than twice that of half mirror) for the disk fabricated at small birefringence such as high density optical disk. On the other hand, in the compact disc having a large birefringence over the standard, a same quantity of light as in the half mirror was obtained, and a sufficient reproduction output was maintained. As for the incident angle around the luminous flux entering the beam splitter from the laser, a sufficiently satisfactory result was obtained at 40° to 60° appropriate for the structure of the optical head.

Incidentally, when the back side coating of the antireflection film was omitted, although the reproduction output was slightly lowered in the compact disc having a large birefringence over the standard, there was no effect on reproduction.

The fabricated samples were presented for heat shock test (holding at 80° C. and −40° C. for 1 hour each, repeating 10 cycles), high temperature and high humidity test (60° C., 90% RH, 1000 hours), low temperature test (−40° C., 1000 hours), tape peel test, and other reliability tests, and changes of optical characteristics and surface observation by optical microscope were investigated before and after tests, but no change was detected.

Thus, the practical optical head completely free from problem in performance and reliability was realized.

The beam splitter of the embodiment is made of most common film materials as the optical film materials such as $TiO_2$ and $SiO_2$, and is formed in a simple structure coating an inexpensive glass substrate with these three layer films, and it is easy to mass-produce, and unlike the beam splitter using prism, it does not require complicated processing, polishing and adhering process, and hence it is low in cost and is very useful.

It can be also applied to other laser wavelength only by changing the film thickness.

In the embodiment, the film composition is as shown in Table 2, but the number of layers and film thickness of each layer are not limited to the shown example.

In this embodiment, the vacuum deposition is employed as film forming method, but it is not limitative, and, for example, sputtering, CVD or sol-gel method may be also employed.

Thus, according to embodiments 4 and 5, by using the beam splitter forming at least one layer of $TiO_2$ film on a glass substrate, the optical head solving the above problems can be realized at low cost, and hence it is very useful.

(Embodiment 6)

An embodiment of optical head using a different beam splitter is described below.

First, a fabricating method of beam splitter is described.

A glass substrate (refractive index 1.51) was heated to 300° C. in a vacuum deposition apparatus, and when the degree of vacuum reached $5\times10^{-6}$ Torr, a first layer of $MgF_2$ (refractive index 1.38) was evaporated by an electron gun to an optical film thickness shown in Table 3. In succession, oxygen gas was introduced into the apparatus through a pressure controller to set the degree of vacuum to $8\times10^{-5}$ Torr, and a second layer of $Al_2O_3$ (refractive index 1.62) was evaporated to an optical film thickness in Table 3. Similarly, thereafter $MgF_2$ and $Al_2O_3$ films were alternately laminated in a total of ten layers. Later, while maintaining the vacuum, the substrate was inverted, and the antireflection film (AR film) composed of $MgF_2$ and $Al_2O_3$ films in Table 1 was formed in the same film forming condition. After releasing to the atmosphere, the substrate was taken out and cut off, and samples were prepared.

TABLE 3

| | Material | Refractive index | Optical film thickness |
|---|---|---|---|
| Layer 1 | $MgF_2$ | 1.38 | 1.19λ |
| Layer 2 | $Al_2O_3$ | 1.62 | 2.35λ |
| Layer 3 | $MgF_2$ | 1.38 | 1.19λ |
| Layer 4 | $Al_2O_3$ | 1.62 | 1.19λ |
| Layer 5 | $MgF_2$ | 1.38 | 1.19λ |
| Layer 6 | $Al_2O_3$ | 1.62 | 1.19λ |
| Layer 7 | $MgF_2$ | 1.38 | 1.19λ |
| Layer 8 | $Al_2O_3$ | 1.62 | 1.19λ |
| Layer 9 | $MgF_2$ | 1.38 | 1.19λ |
| Layer 10 | $Al_2O_3$ | 1.62 | 1.19λ |

λ = 662 / 4 nm

Figure 9:
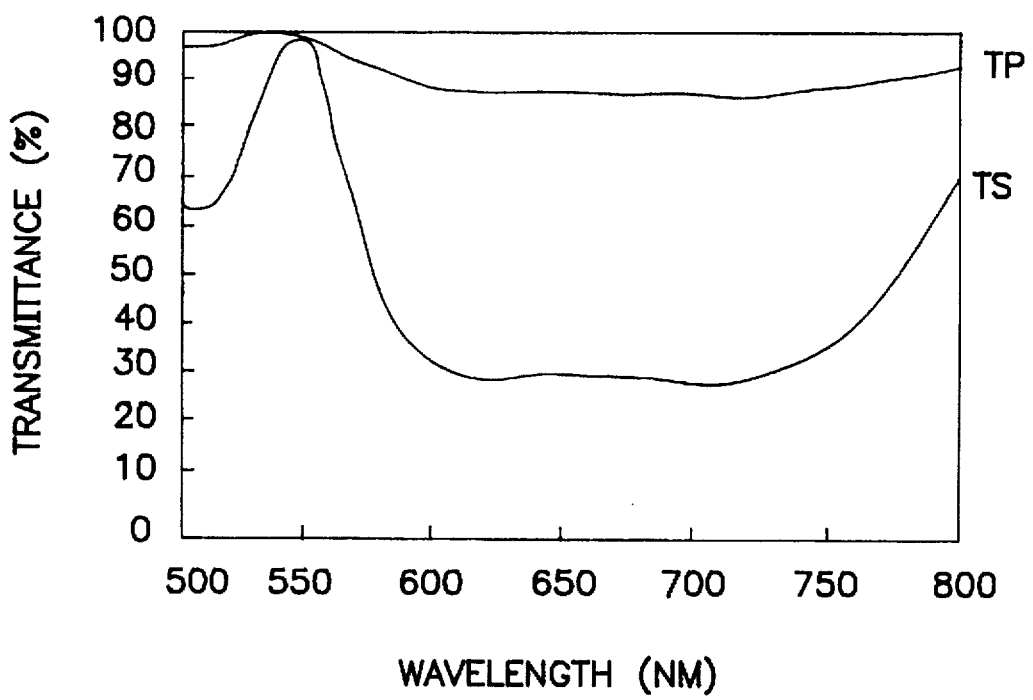
FIG. 9 is a diagram showing the transmittance characteristic of a beam splitter in embodiment 6 of the invention.

The transmission characteristics of the obtained beam splitter are shown in FIG. 9. The characteristics were measured at incident angle of 55°, in the configuration of the light entering from the ten-layer film side and leaving from the AR film. In the diagram, TS and TP refer to the transmittance to S and P polarized light.

Thus was obtained a beam splitter having flat characteristics with S transmittance of 31% (E1 is 0.69) and P transmittance of 90% (E2 is 0.9) in a wide wavelength range centered on the design wavelength 662 nm. It was also confirmed that the absorption can be ignored in the visible region.

Figure 10:
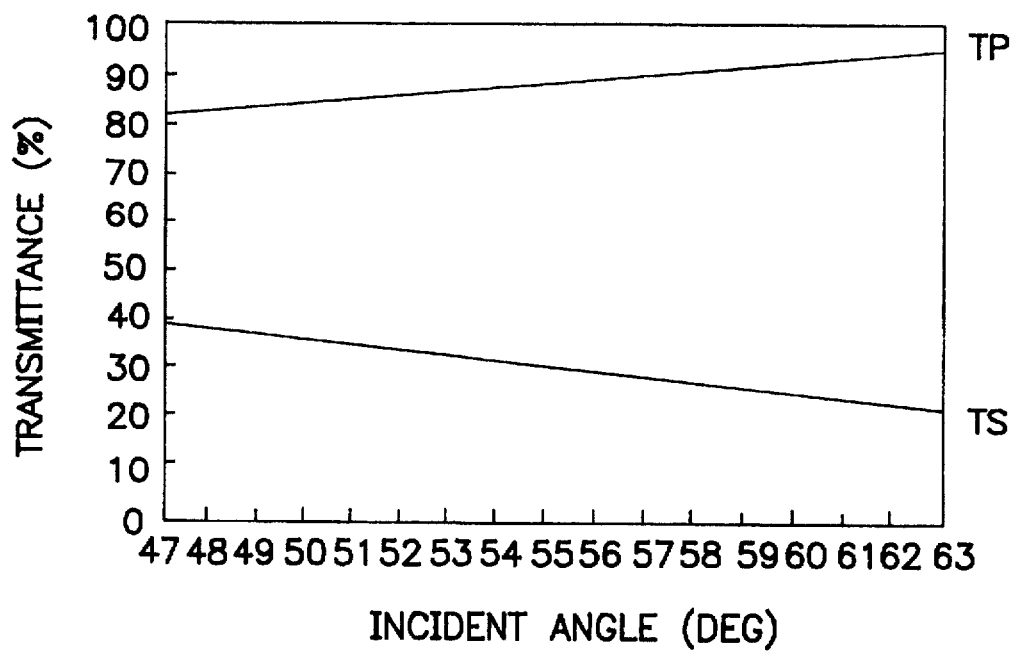
FIG. 10 is a diagram showing the transmittance characteristic to incident angle of the beam splitter in embodiment 6 of the invention.

FIG. 10 shows the transmittance of S polarized light and transmittance of P polarized light in the case of change of incident angle by ±8° from 55°, in the beam splitter of the embodiment at three wavelengths of 642 nm, 662 nm, and 682 nm. It is known from FIG. 10 that the characteristics are almost same at any laser wavelength. This wavelength width of ±20 nm is to allow sufficiently laser wavelength characteristics occurring at the time of laser manufacture or characteristic fluctuations at the time of forming film. Along with the incident angle, the transmittance of S polarized light decreases (the reflectivity increases), and the transmittance of P polarized light increases, and in the disk of small birefringence, therefore, even in the case of non-parallel light entering from the laser, the distribution of quantity of light of the light beam reaching the detector is nearly same as the distribution before incidence of beam splitter.

Incorporating such beam splitter in the optical head in the same constitution as in FIG. 3 and studying, a quantity of light sufficient for maintaining the S/N ratio was obtained (about 2.5 times that of half mirror) for the disk fabricated at small birefringence such as high density optical disk. On the other hand, in the compact disc having a large birefringence over the standard, a same quantity of light as in the half mirror was obtained, and a sufficient reproduction output was maintained. As for the incident angle around the luminous flux entering the beam splitter from the laser, a sufficiently satisfactory result was obtained at 40° to 60° appropriate for the structure of the optical head.

Incidentally, when the back side coating of the antireflection film was omitted, although the reproduction output was slightly lowered in the compact disc having a large birefringence over the standard, there was no effect on reproduction.

The fabricated samples were presented for heat shock test (holding at 80° C. and −40° C. for 1 hour each, repeating 10 cycles), high temperature and high humidity test (60° C., 90% RH, 1000 hours), low temperature test (−40° C., 1000 hours), tape peel test, and other reliability tests, and changes of optical characteristics and surface observation by optical microscope were investigated before and after tests, but no change was detected.

Thus, the practical optical head completely free from problem in performance and reliability was realized.

The beam splitter of the embodiment is very useful because a very large quantity of light is obtained as compared with other flat plate beam splitter, in a disk of small birefringence such as high density optical disk. For example, since the laser output can be suppressed considerably low, it may lead to extension of life of the laser. The optical film thickness is identical except for the second layer, and the film thickness control is relatively easy when forming the film.

Similarly, results of investigation of three types of beam splitter differing in the film composition by alternate lamination of $MgF_2$ film and $Al_2O_3$ film are shown in Table 4.

TABLE 4

|  |  | Film composition 1 | Film composition 2 | Film composition 3 |
|---|---|---|---|---|
|  |  | Optical film thickness | | |
| Layer 1 | $MgF_2$ | 2.39λ | 1.13λ | 1.75λ |
| Layer 2 | $Al_2O_3$ | 1.55λ | 2.23λ | 1.98λ |
| Layer 3 | $MgF_2$ | 2.33λ | 1.13λ | 1.12λ |
| Layer 4 | $Al_2O_3$ | 1.19λ | 1.13λ | 1.12λ |
| Layer 5 | $MgF_2$ | 1.19λ | 1.13λ | 1.12λ |
| Layer 6 | $Al_2O_3$ | 1.19λ | 1.13λ | 1.12λ |
| Layer 7 | $MgF_2$ | 1.19λ | 1.13λ | 1.12λ |
| Layer 8 | $Al_2O_3$ | 1.19λ | 1.13λ | 1.12λ |
| Layer 9 | $MgF_2$ | — | 1.13λ | — |
| Layer 10 | $Al_2O_3$ | — | 1.13λ | — |
| Layer 11 | $MgF_2$ | — | 1.13λ | — |
| Layer 12 | $Al_2O_3$ | — | 1.13λ | — |
| Incident angle | | 55° | 45° | 45° |
| S transmittance (%) | | 50 | 30 | 50 |
| P transmittance (%) | | 96 | 71 | 85 |
| Applicable to high density optical disk | | OK | OK | OK |
| Applicable to non-standard compact disc | | OK | OK | OK |
| Reliability | | OK | OK | OK |

λ = 662 / 4 nm

Thus, by properly changing the film composition, the transmittance (reflectivity) the S polarized light can be freely set while keeping a flat characteristic to wavelength.

The beam splitter of embodiment 6 is made of most common film materials as the optical film materials such as $MgF_2$ and $Al_2O_3$, and is formed in a simple structure coating an inexpensive glass substrate with these multiple layers, and it is easy to mass-produce, and unlike the beam splitter using prism, it does not require complicated processing, polishing and adhering process, and hence it is low in cost and is very useful.

It can be also applied to other laser wavelength only by changing the film thickness.

In the embodiment, the film composition is as shown in Tables 3 and 4, but the number of layers and film thickness of each layer are not limited to the shown examples.

In this embodiment, the vacuum deposition is employed as film forming method, but it is not limitative, and, for example, sputtering, CVD or sol-gel method may be also employed.

Meanwhile, as other film materials than those used in the embodiment, by laminating alternately the films mainly composed of $MgF_2$ as a low refractive index film material and a film with refractive index of 1.56 to 1.92 as a high refractive index material, it was found by calculation that a beam splitter of a very high efficiency can be obtained, in particular, at the incident angle of 55° in the center of luminous flux, in a wide wavelength region, at reflectivity of S polarized light of 70% and transmittance of P polarized light of 85% or more.

(Embodiment 7)

In embodiment 7, the beam splitter was formed by alternate layers of $Al_2O_3$ film as high refractive index film and $MgF_2$ film as low refractive index film, and in this embodiment, part of $MgF_2$ is replaced by $SiO_2$ film, and the efficacy of this beam splitter is described below.

The fabrication was in the same method as in embodiment 6, and a total of 12 films of $MgF_2$, $SiO_2$ and $Al_2O_3$ films were evaporated to the optical film thickness specified in Table 5, and by inverting, the AR film having the film composition as shown in Table 1 was formed. To form the $SiO_2$ film, meanwhile oxygen gas was not introduced.

TABLE 5

|  | Material | Refractive index | Optical film thickness |
|---|---|---|---|
| Layer 1 | $SiO_2$ | 1.46 | 2.96λ |
| Layer 2 | $Al_2O_3$ | 1.62 | 1.19λ |
| Layer 3 | $SiO_2$ | 1.46 | 2.43λ |
| Layer 4 | $Al_2O_3$ | 1.62 | 1.19λ |
| Layer 5 | $MgF_2$ | 1.38 | 1.19λ |
| Layer 6 | $Al_2O_3$ | 1.62 | 1.19λ |
| Layer 7 | $MgF_2$ | 1.38 | 1.19λ |
| Layer 8 | $Al_2O_3$ | 1.62 | 1.19λ |
| Layer 9 | $MgF_2$ | 1.38 | 1.19λ |
| Layer 10 | $Al_2O_3$ | 1.62 | 1.19λ |
| Layer 11 | $SiO_2$ | 1.46 | 1.19λ |
| Layer 12 | $Al_2O_3$ | 1.62 | 1.19λ |

Figure 11:
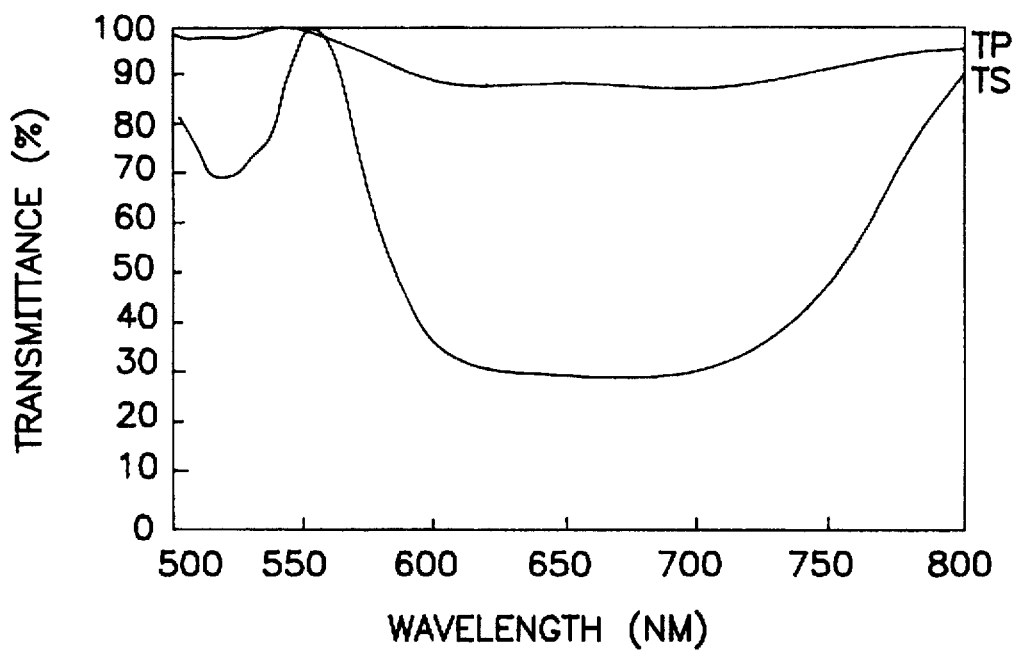
FIG. 11 is a diagram showing the transmittance characteristic of a beam splitter in embodiment 7 of the invention.

The transmission characteristics of the obtained beam splitter are shown in FIG. 11. The characteristics were measured at incident angle of 55°, in the configuration of the light entering from the twelve-layer film side and leaving from the AR film. In the diagram, TS and TP refer to the transmittance to S and P polarized light.

Thus was obtained a flat plate type half mirror having flat characteristics with S transmittance of 30% (E1 is 0.7) and P transmittance of 89% (E2 is 0.89) in a wide wavelength. The obtained characteristics were similar to those of the beam splitter not containing the $SiO_2$ film shown in embodiment 6. It was also confirmed that the absorption can be ignored in the visible region.

Figure 12:
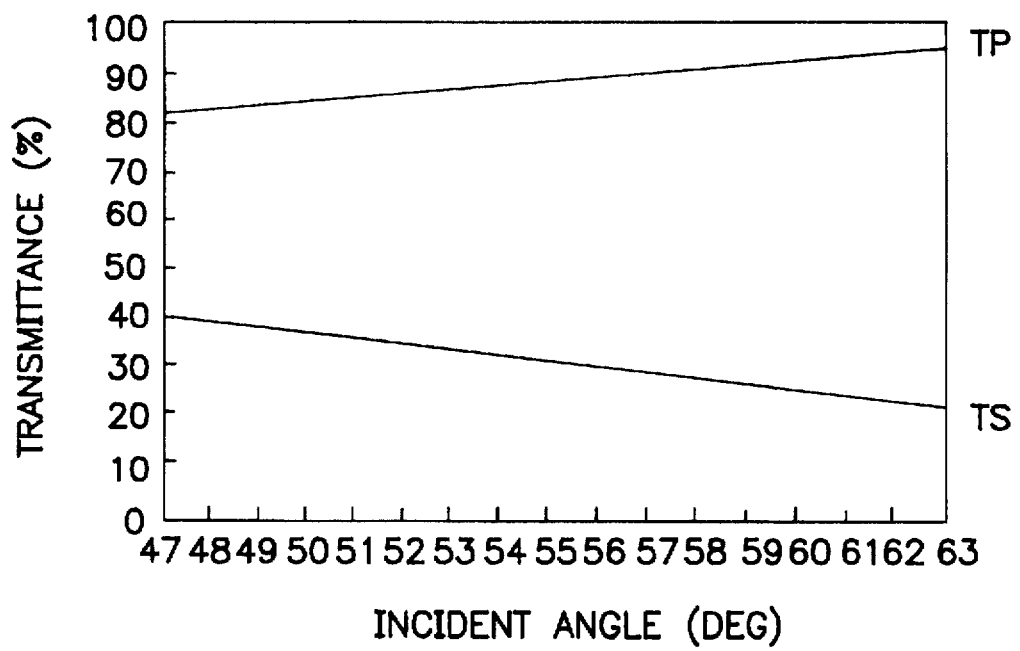
FIG. 12 is a diagram showing the transmittance characteristic to incident angle of the beam splitter in embodiment 7 of the invention.

FIG. 12 shows the transmittance of S polarized light and transmittance of P polarized light in the case of change of incident angle by ±8 from 55°, in the beam splitter of the embodiment at three wavelengths of 642 nm, 662 nm, and 682 nm. It is known from FIG. 12 that the characteristics are almost same at any laser wavelength. This wavelength width of ±20 nm is to allow sufficiently laser wavelength characteristics occurring at the time of laser manufacture or characteristic fluctuations at the time of forming film. Along with the incident angle, the transmittance of S polarized light decreases (the reflectivity increases), and the transmittance of P polarized light increases, and in the disk of small birefringence, therefore, even in the case of non-parallel light entering from the laser, the distribution of quantity of light of the light beam reaching the detector is nearly same as the distribution before incidence of beam splitter.

Incorporating such beam splitter in the optical head in the same constitution as in FIG. 3 and studying, a quantity of light sufficient for maintaining the S/N ratio was obtained (about 2.5 times that of half mirror) for the disk fabricated at small birefringence such as high density optical disk. On the other hand, in the compact disc having a large birefringence over the standard, a same quantity of light as in the half mirror was obtained, and a sufficient reproduction output was maintained. As for the incident angle around the luminous flux entering the beam splitter from the laser, a sufficiently satisfactory result was obtained at 40° to 60° appropriate for the structure of the optical head.

Incidentally, when the back side coating of the antireflection film was omitted, although the reproduction output was slightly lowered in the compact disc having a large birefringence over the standard, there was no effect on reproduction.

The fabricated samples were presented for heat shock test (holding at 80° C. and −40° C. for 1 hour each, repeating 10 cycles), high temperature and high humidity test (60° C., 90% RH, 1000 hours), low temperature test (−40° C., 1000 hours), tape peel test, and other reliability tests, and changes of optical characteristics and surface observation by optical microscope were investigated before and after tests, but no change was detected.

Thus, the practical optical head completely free from problem in performance and reliability was realized.

The beam splitter of the embodiment is very useful because a very large quantity of light is obtained as compared with other flat plate beam splitter, in a disk of small birefringence such as high density optical disk. For example, since the laser output can be suppressed considerably low, it may lead to extension of life of the laser.

It is a feature of the beam splitter of the embodiment that the performance as the beam splitter hardly deteriorates if part of the $MgF_2$ film is replaced by $SiO_2$ film which is most widely used s the low refractivity optical film material. Although the $MgF_2$ film is a very excellent low refractivity film material, it is large in the internal stress of the film, and hence it is likely to be separated if the film thickness is large. On the other hand, the $SiO_2$ film is a material superior to $MgF_2$ in chemical and mechanical stability. As a result of actual evaluation, the multi-layer film of the embodiment has been confirmed to be enhanced in mechanical strength to scratch, as compared with the alternate lamination of $MgF_2$ and $Al_2O_3$ films.

Hence, according to the embodiment, the reliability can be further enhanced, and it is extremely useful.

In the embodiment, of the $MgF_2$ film in Table 3, layer 1, layer 10, and layer 12 were composed of $SiO_2$ film, but when layer 1, layer 3 and layer 5 were composed of $SiO_2$ film and the optical film thickness was same as in Table 5, it was confirmed that the same performance and reliability as the beam splitter were obtained.

The beam splitter of the embodiment is made of most common film materials as the optical film materials such as $MgF_2$, $Al_2O_3$ and $SiO_2$, and is formed in a simple structure coating an inexpensive glass substrate with these multiple layers, and it is easy to mass-produce, and unlike the beam splitter using prism, it does not require complicated processing, polishing and adhering process, and hence it is low in cost and is very useful.

It can be also applied to other laser wavelength only by changing the film thickness.

The film composition is not limited to the shown number of layers and film thickness of each layer.

The vacuum deposition is employed as film forming method, but it is not limitative, and, for example, sputtering, CVD or sol-gel method may be also employed.

(Embodiment 8)

An embodiment of optical head using a different beam splitter is described below.

First, a fabricating method of beam splitter is described.

A glass substrate (refractive index 1.51) was heated to 300° C. in a vacuum deposition apparatus, and when the degree of vacuum reached $5 \times 10^6$ Torr, a first layer of $SiO_2$ (refractive index 1.46) was evaporated by an electron gun to an optical film thickness shown in Table 6. In succession, oxygen gas was introduced into the apparatus through a pressure controller to set the degree of vacuum to $1 \times 10^4$ Torr, and a second layer of $Y_2O_3$ (refractive index 1.80) was evaporated to an optical film thickness in Table 6. Similarly, thereafter $SiO_2$ and $Y_2O_3$ films were alternately laminated in a total of eight layers. Later, while maintaining the vacuum, the substrate was inverted, and the antireflection film (AR film) composed of $MgF_2$ and $Al_2O_3$ films shown in Table 1 was formed. After releasing to the atmosphere, the substrate was taken out and cut off, and samples were prepared.

TABLE 6

| | Material | Refractive index | Optical film thickness |
|---|---|---|---|
| Layer 1 | $SiO_2$ | 1.46 | 1.12λ |
| Layer 2 | $Y_2O_3$ | 1.80 | 2.21λ |
| Layer 3 | $SiO_2$ | 1.46 | 1.12λ |
| Layer 4 | $Y_2O_3$ | 1.80 | 1.12λ |
| Layer 5 | $SiO_2$ | 1.46 | 1.12λ |
| Layer 6 | $Y_2O_3$ | 1.80 | 1.12λ |
| Layer 7 | $SiO_2$ | 1.46 | 1.12λ |
| Layer 8 | $Y_2O_3$ | 1.80 | 1.12λ |

λ = 662 / 4 nm

Figure 13:
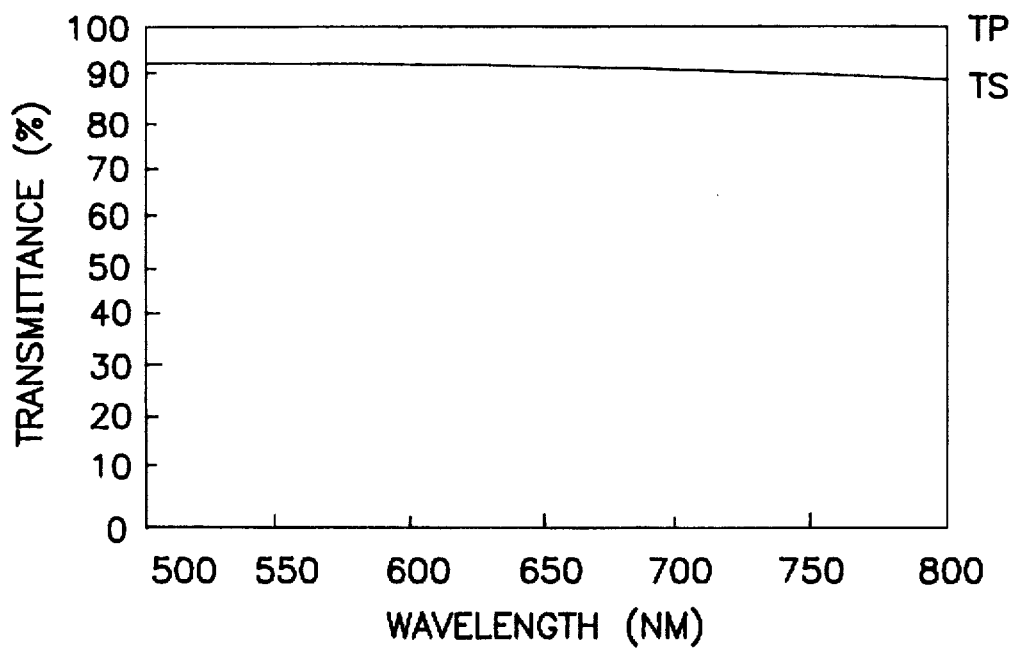
FIG. 13 is a diagram showing the transmittance characteristic of a beam splitter in embodiment 8 of the invention.

The transmission characteristics of the obtained beam splitter are shown in FIG. 13. The characteristics were measured at incident angle of 55°, in the configuration of the light entering from the eight-layer film side and leaving from the AR film. In the diagram, TS and TP refer to the transmittance to S and P polarized light.

Thus was obtained a beam splitter having flat characteristics with S transmittance of 31% (E1 is 0.69) and P transmittance of 85% (E2 is 0.85) in a wide wavelength range centered on the design wavelength 662 nm. It was also confirmed that the absorption can be ignored in the visible region.

Figure 14:
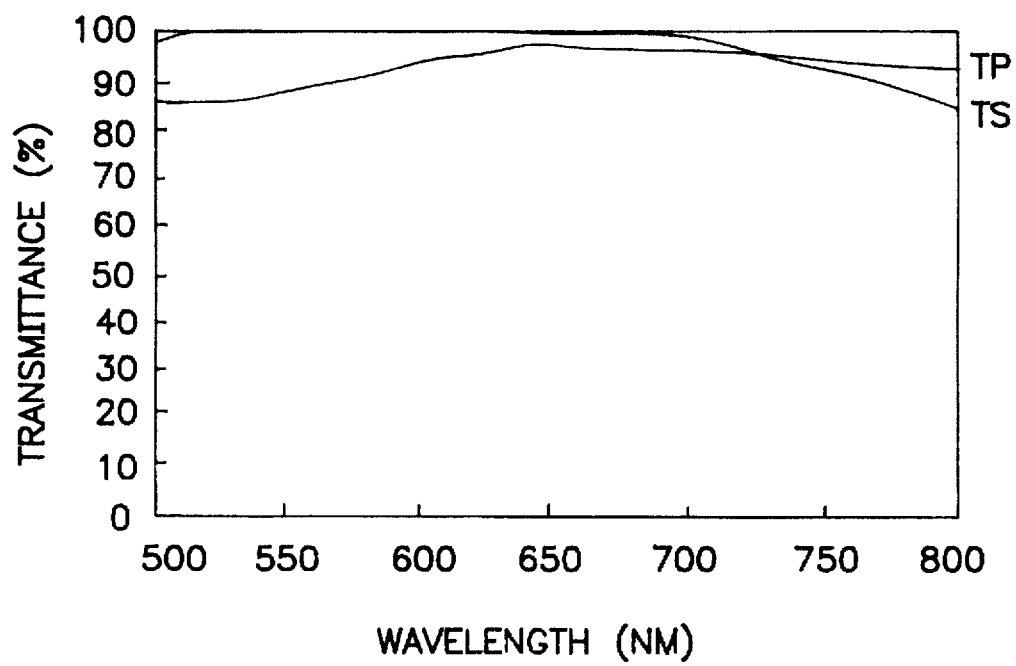
FIG. 14 is a diagram showing the transmittance characteristic to incident angle of the beam splitter in embodiment 8 of the invention.

FIG. 14 shows the transmittance of S polarized light and transmittance of P polarized light in the case of change of incident angle by ±8° from 55°, in the beam splitter of the embodiment at three wavelengths of 642 nm, 662 nm, and 682 nm. It is known from FIG. 14 that the characteristics are almost same at any laser wavelength. This wavelength width of ±20 nm is to allow sufficiently laser wavelength characteristics occurring at the time of laser manufacture or characteristic fluctuations at the time of forming film. Along with the incident angle, the transmittance of S polarized light decreases (the reflectivity increases), and the transmittance of P polarized light increases, and in the disk of small birefringence, therefore, even in the case of non-parallel light entering from the laser, the distribution of quantity of light of the light beam reaching the detector is nearly same as the distribution before incidence of beam splitter.

Incorporating such beam splitter in the optical head in the same constitution as in FIG. 3 and studying, a quantity of light sufficient for maintaining the S/N ratio was obtained (about 2.4 times that of half mirror) for the disk fabricated at small birefringence such as high density optical disk. On the other hand, in the compact disc having a large birefringence over the standard, a same quantity of light as in the half mirror was obtained, and a sufficient reproduction output was maintained. As for the incident angle around the luminous flux entering the beam splitter from the laser, a sufficiently satisfactory result was obtained at 40° to 60° appropriate for the structure of the optical head.

Incidentally, when the back side coating of the antireflection film was omitted, although the reproduction output was slightly lowered in the compact disc having a large birefringence over the standard, there was no effect on reproduction.

The fabricated samples were presented for heat shock test (holding at 80° C. and −40° C. for 1 hour each, repeating 10 cycles), high temperature and high humidity test (60° C., 90% RH, 1000 hours), low temperature test (−40° C., 1000 hours), tape peel test, and other reliability tests, and changes of optical characteristics and surface observation by optical microscope were investigated before and after tests, but no change was detected.

Thus, the practical optical head completely free from problem in performance and reliability was realized.

In the beam splitter of the embodiment, since $SiO_2$ film superior in mechanical performance to $MgF_2$ film is used as low refractive index film material instead of $MgF_2$ film, a higher mechanical strength was confirmed by scratch test.

Besides, the optical film thickness is identical except for the second layer, and the film thickness control is relatively easy when forming the film.

The beam splitter of this embodiment is formed in a simple structure coating an inexpensive glass substrate with these multiple layers, and it is easy to mass-produce, and unlike the beam splitter using prism, it does not require complicated processing, polishing and adhering process, and hence it is low in cost and is very useful.

It can be also applied to other laser wavelength only by changing the film thickness.

In the embodiment, the film composition is not limited to the shown number of layers and film thickness of each layer.

In this embodiment, the vacuum deposition is employed as film forming method, but it is not limitative, and, for example, sputtering, CVD or sol-gel method may be also employed.

Meanwhile, as other film materials than those used in the embodiment, by laminating alternately the films mainly composed of $SiO_2$ as a low refractive index film material and a film with refractive index of 1.62 to 1.85 as a high refractive index material, it was found by calculation that a beam splitter of a very high efficiency can be obtained, in particular, at the incident angle of 55° in the center of luminous flux, in a wide wavelength region, at reflectivity of S polarized light of 70% and transmittance of P polarized light of 85% or more.

The antireflection films used in the foregoing embodiments are described below while referring to the prior art.

In the optical head in FIG. 3, the beam splitter which is luminous flux splitting means is required to transmit the reflected light from the disk as much as possible, and lead into the photo detector. Accordingly, it is preferred to form an antireflection film on the back side of the optical film surface 22a.

The light entering the beam splitter from the disk side is a P polarized light in the disk with small birefringence such as high density optical disk, but is an S polarized light in a worst case such as non-standard compact disk.

Therefore, the antireflection film is required to have a nearly 100% transmittance characteristic for both S and P polarized light. Further, to allow wavelength fluctuations of non-parallel light or laser, the characteristic is required to be flat in a relatively wide wavelength region.

Figure 15:
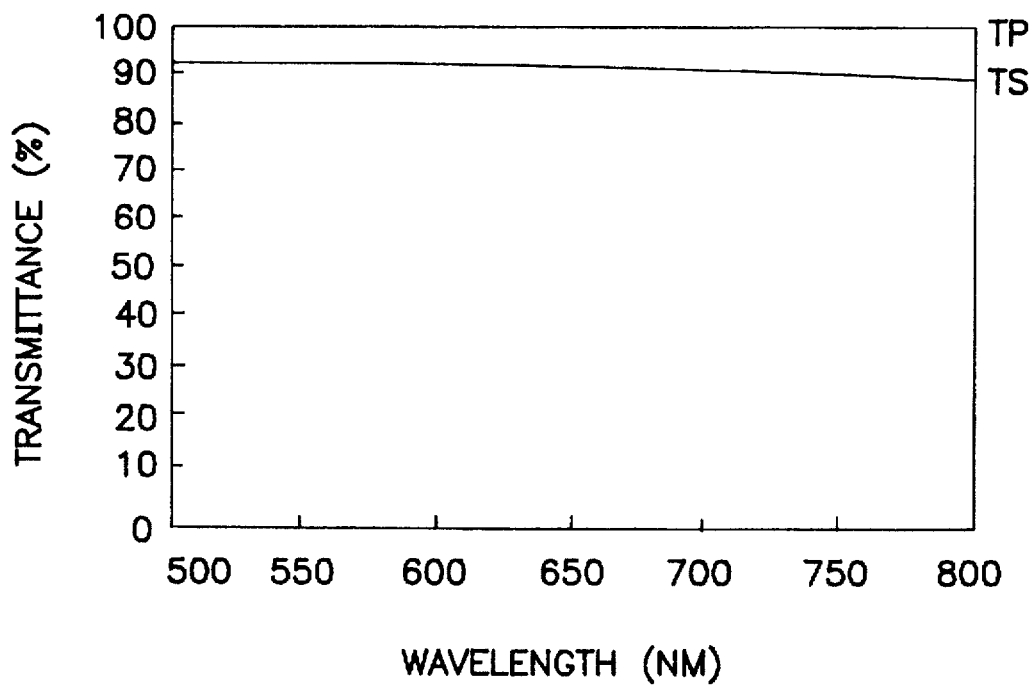
FIG. 15 is a diagram showing the transmittance characteristic of a conventional $MgF_2$ single film antireflection film (simulation).

FIG. 15 shows simulation results of transmittance characteristic of coating of glass substrate with $MgF_2$ single film widely used as antireflection film for glass coating. At incident angle of 55°, virtually, 100% transmittance was assumed in the full wavelength region in both S and P polarized light. Herein, TS and TP respectively refer to transmittance characteristic of S and P polarized light.

Thus, in the flat characteristic and the P polarized light transmittance of nearly 100%, the transmittance of S polarized light is about 93% at most. Although the $MgF_2$ single layer film has an excellent performance in vertical incidence, a satisfactory result is not obtained in an oblique incident light as in the invention.

Figure 16:
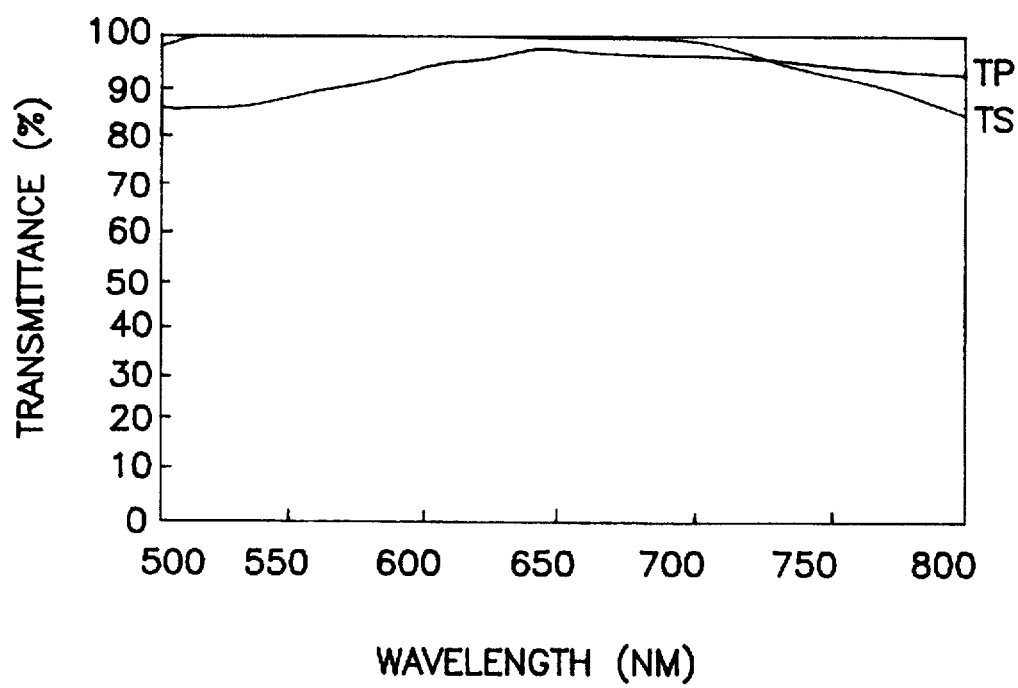
FIG. 16 is a diagram showing the transmittance characteristic of a conventional $TiO_2$ $SiO_2$ film antireflection film (simulation).

FIG. 16 shows simulation results of transmittance characteristic of coating of glass substrate with a first layer of $TiO_2$ film (refractive index 2.30, optical film thickness 1.79 $\lambda$) and a second layer of $SiO_2$ film (refractive index 1.46, optical film thickness 0.81 $\lambda$). At incident angle of 55°, virtually, 100% transmittance was assumed in the full wavelength region in both S and P polarized light. Herein, TS and TP respectively refer to transmittance characteristic of S and P polarized light.

As shown herein, in both S and P polarized light, the maximum transmittance is nearly 100%, but mutual wavelengths are deviated, and the characteristic is not sufficiently flat against wavelength, and the result is not satisfactory.

Figure 17:
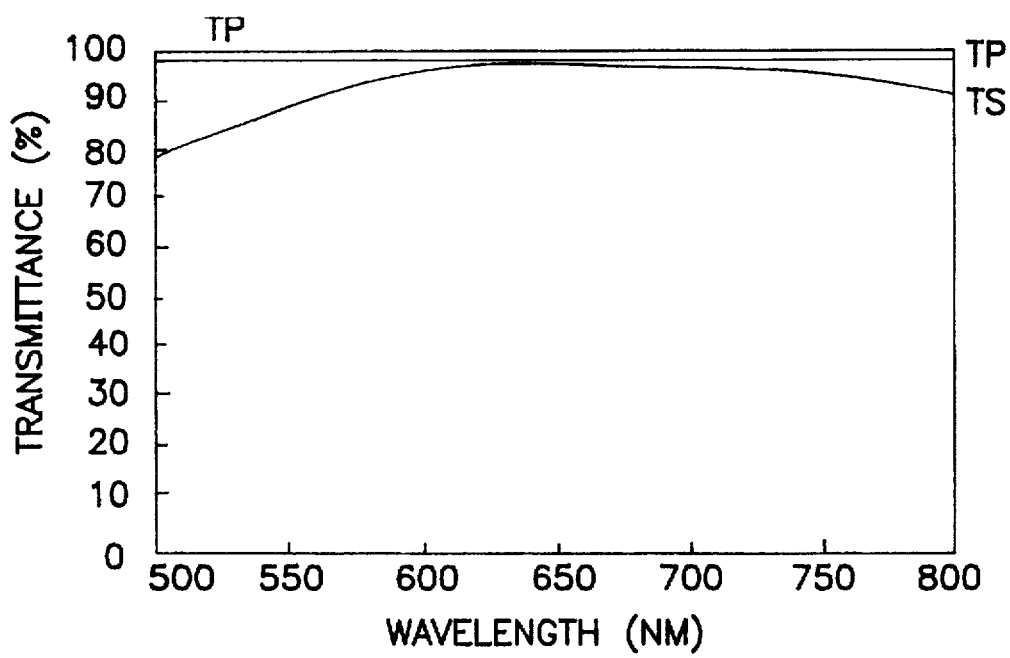
FIG. 17 is a diagram showing the transmittance characteristic of an antireflection film of the invention.

On the other hand, FIG. 17 shows simulation results of transmittance characteristic of forming an antireflection film of $MgF_2$ and $Al_2O_3$ films having film composition as shown in Table 1 on a glass substrate used in the foregoing embodiments. At incident angle of 55°, virtually, 100% transmittance was assumed in the full wavelength region in both S and P polarized light. Herein, TS and TP respectively refer to transmittance characteristic of S and P polarized light.

At the wavelength width near 100 nm, a transmittance of about 99% was obtained in both S and P polarized light. This is a satisfactory result for use in the optical head of the invention. As mentioned in the embodiments, when this film composition was actually fabricated, the results were same as in the simulation, and there was no problem in reliability.

The film composition of the antireflection film is not limited in the number of films and film thickness as specified in Table 1 as far as it is mainly composed of $MgF_2$ and $Al_2O_3$ films.

It can be also applied to other laser wavelength only by changing the film thickness.

The vacuum deposition is employed as film forming method, but it is not limitative, and, for example, sputtering, CVD or sol-gel method may be also employed.

(Embodiment 9)

The following embodiments refer to optical heads comprising beam splitters having functions of splitting the incident light of P polarized light into reflection and transmission, and reflecting the incident light of S polarized light almost completely same as in the luminous flux splitting means shown in FIG. 1.

A fabricating method of beam splitter is described.

A glass prism (refractive index 1.51) was heated to 300° C. in a vacuum deposition apparatus, and when the degree of vacuum reached $5 \times 10^{-6}$ Torr, oxygen gas was introduced into the apparatus through a pressure controller to set the degree of vacuum to $1.5 \times 10^{-4}$ Torr, and a $TiO_2$ film (refractive index 2.30) was evaporated by an electron gun, and then by stopping the introduction of oxygen gas, an $SiO_2$ film (refractive index 1.46) was evaporated. Similarly, each layer was set to an optical film thickness in Table 7, and a dielectric multi-layer film composed of a total of seven layers was formed. After cooling, the prism was taken out, and it was joined with other prism not forming film, and a beam splitter was fabricated.

TABLE 7

| | Material | Refractive index | Optical film thickness |
|---|---|---|---|
| Layer 1 | $TiO_2$ | 2.30 | 1.27$\lambda$ |
| Layer 2 | $SiO_2$ | 1.46 | 1.27$\lambda$ |
| Layer 3 | $TiO_2$ | 2.30 | 1.27$\lambda$ |
| Layer 4 | $SiO_2$ | 1.46 | 1.27$\lambda$ |
| Layer 5 | $TiO_2$ | 2.30 | 1.27$\lambda$ |
| Layer 6 | $SiO_2$ | 1.46 | 1.27$\lambda$ |
| Layer 7 | $TiO_2$ | 2.30 | 1.27$\lambda$ |

$\lambda = 662 / 4$ nm

Figure 18:
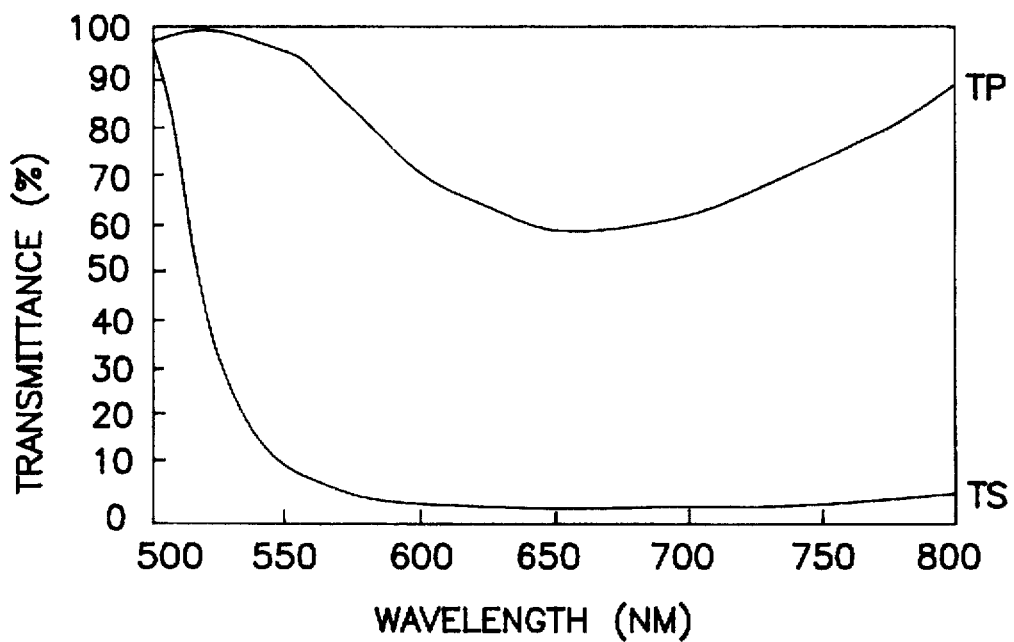
FIG. 18 is a diagram showing the transmittance characteristic of a beam splitter in embodiment 9 of the invention.

The transmission characteristics of the obtained beam splitter are shown in FIG. 18. The characteristics were measured at incident angle of 45°, and TS and TP refer to the transmittance to S and P polarized light.

Thus was obtained a beam splitter having characteristics with S transmittance of 2% (E2 is 0.98) and P transmittance of 59% (E1 is 0.59) at the design wavelength 662 nm. It was also confirmed that the absorption can be ignored in the visible region.

Incorporating the beam splitter of the embodiment in the optical head in the same constitution as in FIG. 1 and studying, a quantity of light sufficient for maintaining the S/N ratio was obtained (about 2.4 times that of half mirror) for the disk fabricated at small birefringence such as high density optical disk. On the other hand, in the compact disc having a large birefringence over the standard, a same quantity of light as in the half mirror was obtained, and a sufficient reproduction output was maintained. At this time, the incident angle of the luminous flux entering the beam splitter from the laser was 45°. It was also confirmed sufficiently allowable for fluctuations of laser wavelength occurring at the time of laser fabrication or fluctuations of characteristic at the time of film forming of about ±20 an.

In the embodiment, the antireflection film is formed on the laser incident and exit planes of the prism, but if this coating of antireflection film was omitted, although the output was slightly lowered in both high density optical disk and non-standard compact disk, there was no effect on performance.

The fabricated samples were presented for heat shock test (holding at 80° C. and −40° C. for 1 hour each, repeating 10 cycles), high temperature and high humidity test (60° C., 90% RH, 1000 hours), low temperature test (−40° C., 1000 hours), and other reliability tests, and changes of optical characteristics were investigated before and after tests, but no charge was detected.

Thus, the practical optical head completely free from problem in performance and reliability was realized.

In the beam splitter of the embodiment, since most reliable film materials such as $TiO_2$ and $SiO_2$ are used as optical film material, there is no problem in reliability. Moreover, each layer is equal in optical film thickness, and the film thickness control is very easy, in particular, when an optical monitor is used.

It can be also applied to other laser wavelength only by changing the film thickness.

In the embodiment, the film composition is shown in Table 7, but it is not limited to the shown number of layers and film thickness of each layer.

In this embodiment, the vacuum deposition is employed as film forming method, but it is not limitative, and, for example, sputtering, CVD or sol-gel method may be also employed.

(Embodiment 10)

An embodiment of an optical head using other beam splitter is described below.

The fabricating method is same as in embodiment 9, and a dielectric multi-layer film in the composition in Table 8 was fabricated and cooled, and the prism was taken out, and it was joined with other prism not forming film, and a beam splitter was fabricated.

TABLE 8

|  | Material | Refractive index | Optical film thickness |
| --- | --- | --- | --- |
| Layer 1 | $TiO_2$ | 2.30 | 1.19λ |
| Layer 2 | $SiO_2$ | 1.46 | 1.19λ |
| Layer 3 | $TiO_2$ | 2.30 | 1.19λ |
| Layer 4 | $SiO_2$ | 1.46 | 1.19λ |
| Layer 5 | $TiO_2$ | 2.30 | 1.19λ |

TABLE 8-continued

|  | Material | Refractive index | Optical film thickness |
| --- | --- | --- | --- |
| Layer 6 | $SiO_2$ | 1.46 | 1.19λ |
| Layer 7 | $TiO_2$ | 2.30 | 1.91λ |
| Layer 8 | $SiO_2$ | 1.46 | 1.19λ |
| Layer 9 | $TiO_2$ | 2.30 | 2.17λ |

λ = 662 / 4 nm

Figure 19:
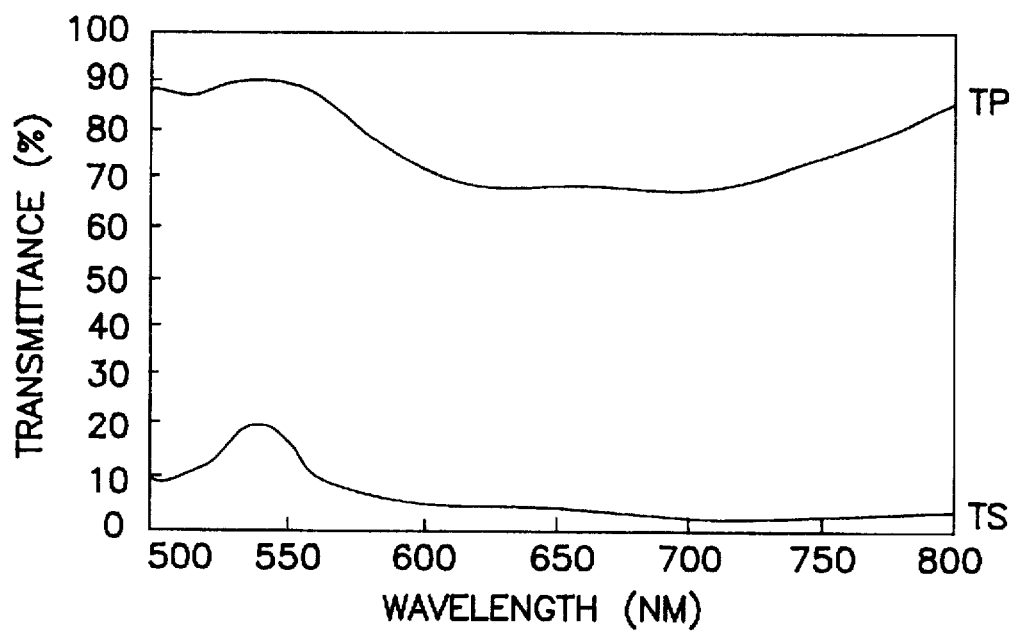
FIG. 19 is a diagram showing the transmittance characteristic of a beam splitter in embodiment 10 of the invention.

The transmission characteristics of the obtained beam splitter are shown in FIG. 19. The characteristics were measured at incident angle of 45°, and TS and TP refer to the transmittance to S and P polarized light.

Thus was obtained a beam splitter having flat characteristics with S transmittance of 3% (E2 is 0.97) and P transmittance of 69% (E1 is 0.69) at the design wavelength 662 nm. It was also confirmed that the absorption can be ignored in the visible region.

Incorporating the beam splitter of the embodiment in the optical head in the same constitution as in FIG. 1 and studying, a quantity of light sufficient for maintaining the S/N ratio was obtained (about 3 times that of half mirror) for the disk fabricated at small birefringence such as high density optical disk. On the other hand, in the compact disc having a large birefringence over the standard, a same quantity of light as in the half mirror was obtained, and a sufficient reproduction output was maintained. At this time, the incident angle of the luminous flux entering the beam splitter from the laser was 45°. It was also confirmed sufficiently allowable for fluctuations of laser wavelength occurring at the time of laser fabrication or fluctuations of characteristic at the time of film forming of about ±20 nm.

In the embodiment, the antireflection film is formed on the laser incident and exit planes of the prism, but if this coating of antireflection film was omitted, although the output was slightly lowered in both high density optical disk and non-standard compact disk, there was no effect on performance.

The fabricated samples were presented for heat shock test (holding at 80° C. and −40° C. for 1 hour each, repeating 10 cycles), high temperature and high humidity test (60° C., 90% RH, 1000 hours), low temperature test (−40° C., 1000 hours), and other reliability tests, and changes of optical characteristics were investigated before and after tests, but no change was detected.

Thus, the practical optical head completely free from problem in performance and reliability was realized.

In the beam splitter of the embodiment, since most reliable film materials such as $TiO_2$ and $SiO_2$ are used as optical film material, there is no problem in reliability.

It can be also applied to other laser wavelength only by changing the film thickness.

In the embodiment, as shown in Table 8, layer 7 was 1.91 λ, layer 9 was 2.17 λ, and other layers were 1.19 λ, but same performance and reliability were obtained by layer 1 of 2.17λ, layer 3 of 1.91 λ, and other layers of 1.19λ. In this embodiment, the vacuum deposition is employed as film forming method, but it is not limitative, and, for example, sputtering, CVD or sol-gel method may be also employed.

(Embodiment 11)

An embodiment of an optical head using a different beam splitter is described below.

A fabricating method of beam splitter is described.

A glass prism (refractive index 1.51) was heated to 300° C. in a vacuum deposition apparatus, and when the degree of vacuum reached $5\times10^{-6}$ Torr, oxygen gas was introduced into the apparatus through a pressure controller to set the degree of vacuum to $1.0 \times 10^{-4}$ Torr, and a $Ta_2O_5$ film (refractive index 2.10) was evaporated by an electron gun, and then by stopping the introduction of oxygen gas, an $SiO_2$ film (refractive index 1.46) was evaporated. Similarly, each layer was set to an optical film thickness in Table 9, and a dielectric multi-layer film composed of a total of nine layers was formed. After cooling, the prism was taken out, and it was joined with other prism not forming film, and a beam splitter was fabricated.

TABLE 9

|  | Material | Refractive index | Optical film thickness |
|---|---|---|---|
| Layer 1 | $Ta_2O_5$ | 2.10 | 1.30λ |
| Layer 2 | $SiO_2$ | 1.46 | 1.30λ |
| Layer 3 | $Ta_2O_5$ | 2.10 | 1.30λ |
| Layer 4 | $SiO_2$ | 1.46 | 1.30λ |
| Layer 5 | $Ta_2O_5$ | 2.10 | 1.30λ |
| Layer 6 | $SiO_2$ | 1.48 | 1.30λ |
| Layer 7 | $Ta_2O_5$ | 2.10 | 1.30λ |
| Layer 8 | $SO_2$ | 1.46 | 1.30λ |
| Layer 9 | $Ta_2O_5$ | 2.10 | 1.30λ |

λ = 662 / 4 nm

Figure 20:
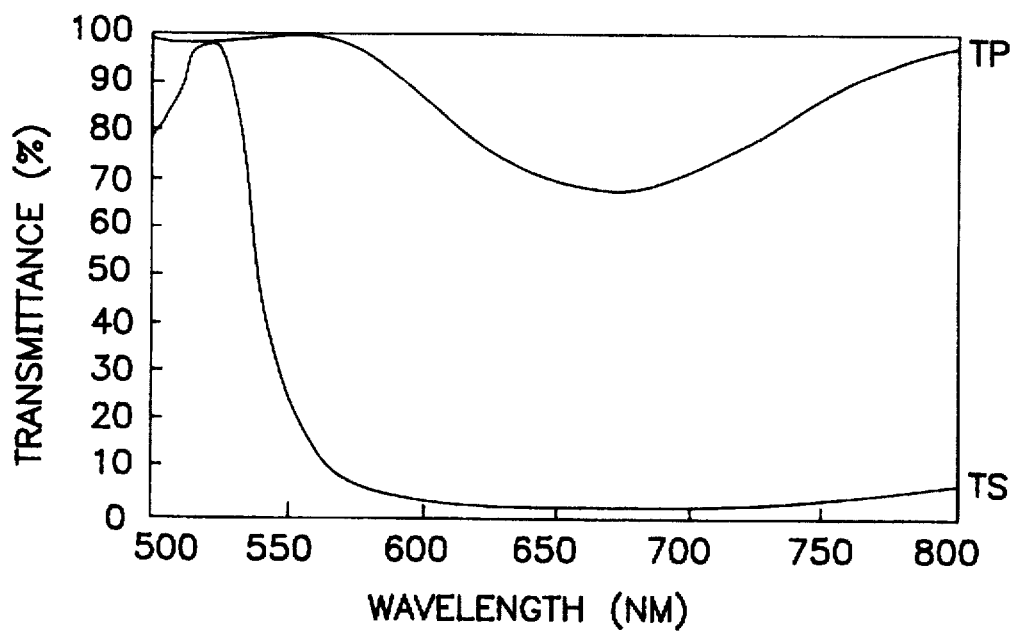
FIG. 20 is a diagram showing the transmittance characteristic of a beam splitter in embodiment 11 of the invention.

The transmission characteristics of the obtained beam splitter are shown in FIG. 20. The characteristics were measured at incident angle of 45°, and TS and TP refer to the transmittance to S and P polarized light.

Thus was obtained a beam splitter having characteristics with S transmittance of 2% (E2 is 0.98) and P transmittance of 67% (E1 is 0.67) at the design wavelength 662 nm. It was also confirmed that the absorption can be ignored in the visible region.

Incorporating the beam splitter of the embodiment in the optical head in the same constitution as in FIG. 1 and studying, a quantity of light sufficient for maintaining the S/N ratio was obtained (about 3 times that of half mirror) for the disk fabricated at small birefringence such as high density optical disk. On the other hand, in the compact disc having a large birefringence over the standard, a same quantity of light as in the half mirror was obtained, and a sufficient reproduction output was maintained. At this time, the incident angle of the luminous flux entering the beam splitter from the laser was 45°. It was also confirmed sufficiently allowable for fluctuations of laser wavelength occurring at the time of laser fabrication or fluctuations of characteristic at the time of film forming of about 20 nm.

In the embodiment, the antireflection film is formed on the laser incident and exit planes of the prism, but if this coating of antireflection film was omitted, although the output was slightly lowered in both high density optical disk and non-standard compact disk, there was no effect on performance.

The fabricated samples were presented for heat shock test (holding at 80° C. and −40° C. for 1 hour each, repeating 10 cycles), high temperature and high humidity test (60° C., 90% RH, 1000 hours), low temperature test (−40° C., 1000 hours), and other reliability tests, and changes of optical characteristics were investigated before and after tests, but no change was detected.

Thus, the practical optical head completely free from problem in performance and reliability was realized.

In the beam splitter of the embodiment, since most reliable film materials such as $Ta_2O_5$ and $SiO_2$ are used as optical film material, there is no problem in reliability. Moreover, each layer is equal in optical film thickness, and the film thickness control is very easy, in particular, when an optical monitor is used.

As compared with embodiments 9 and 10, the beam splitter of embodiment 11 is relatively larger in the number of film layers because $TiO_2$ is not used as film material, but has its own merits. When adhering a prism with film and a prism without film, generally, an ultraviolet setting resin is used, but according to the property of $TiO_2$, when irradiated with an excessive ultraviolet rays in enclosed conditions, the reduction is promoted and light absorption occurs. Although this problem can be completely eliminated by strict time control, the yield may be lowered possibly. The film material of this embodiment is completely free from such risk.

It can be also applied to other laser wavelength only by changing the film thickness.

In the embodiment, the film composition is shown in Table 9, but it is not limited to the shown number of layers and film thickness of each layer.

In this embodiment, the vacuum deposition is employed as film forming method, but it is not limitative, and, for example, sputtering, CVD or sol-gel method may be also employed.

(Embodiment 12)

An embodiment of an optical head using other beam splitter is described below.

The fabricating method is same as in embodiment 11, and a dielectric multi-layer film in the composition in Table 10 was fabricated and cooled, and the prism was taken out, and it was joined with other prism not forming film, and a beam splitter was fabricated.

TABLE 10

|  | Material | Refractive index | Optical film thickness |
|---|---|---|---|
| Layer 1 | $Ta_2O_5$ | 2.10 | 1.06λ |
| Layer 2 | $SiO_2$ | 1.46 | 1.59λ |
| Layer 3 | $Ta_2O_5$ | 2.10 | 1.06λ |
| Layer 4 | $SiO_2$ | 1.46 | 1.59λ |
| Layer 5 | $Ta_2O_5$ | 2.10 | 1.06λ |
| Layer 6 | $SiO_2$ | 1.46 | 1.59λ |
| Layer 7 | $Ta_2O_5$ | 2.10 | 1.06λ |
| Layer 8 | $SiO_2$ | 1.46 | 1.59λ |
| Layer 9 | $Ta_2O_5$ | 2.10 | 1.06λ |
| Layer 10 | $SiO_2$ | 1.46 | 1.59λ |
| Layer 11 | $Ta_2O_5$ | 2.10 | 1.97λ |
| Layer 12 | $SiO_2$ | 1.46 | 1.59λ |
| Layer 13 | $Ta_2O_5$ | 2.10 | 1.97λ |

λ = 662 / 4 nm

Figure 21:
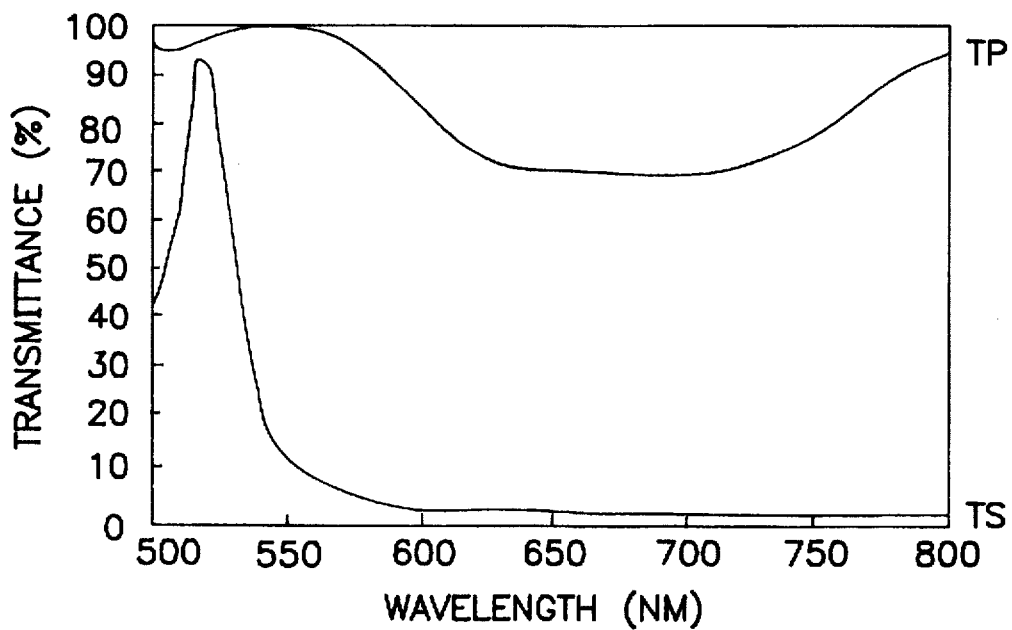
FIG. 21 is a diagram showing the transmittance characteristic of a beam splitter in embodiment 12 of the invention.

The transmission characteristics of the obtained beam splitter are shown in FIG. 21. The characteristics were measured at incident angle of 45°, and TS and TP refer to the transmittance to S and P polarized light.

Thus was obtained a beam splitter having flat characteristics with S transmittance of 1% (E2 is 0.99) and P transmittance of 70% (E1 is 0.7) at the design wavelength 662 nm. It was also confirmed that the absorption can be ignored in the visible region.

Incorporating the beam splitter of the embodiment in the optical head in the same constitution as in FIG. 1 and studying, a quantity of light sufficient for maintaining the S/N ratio was obtained (about 3 times that of half mirror) for the disk fabricated at small birefringence such as high density optical disk. On the other hand, in the compact disc having a large birefringence over the standard, a same quantity of light as in the half mirror was obtained, and a sufficient reproduction output was maintained. At this time, the incident angle of the luminous flux entering the beam splitter from the laser was 45°. It was also confirmed sufficiently allowable for fluctuations of laser wavelength occurring at the time of laser fabrication or fluctuations of characteristic at the time of film forming of about ±20 nm.

In the embodiment, the antireflection film is formed on the laser incident and exit planes of the prism, but if this coating of antireflection film was omitted, although the output was slightly lowered in both high density optical disk and non-standard compact disk, there was no effect on performance.

The fabricated samples were presented for heat shock test (holding at 80° C. and −40° C. for 1 hour each, repeating 10 cycles), high temperature and high humidity test (60° C., 90% RH, 1000 hours), low temperature test (−40° C., 1000 hours), and other reliability tests, and changes of optical characteristics were investigated before and after tests, but no change was detected.

Thus, the practical optical head completely free from problem in performance and reliability was realized.

In the beam splitter of the embodiment, since most reliable film materials such as $Ta_2O_5$ and $SiO_2$ are used as optical film material, there is no problem in reliability.

As in the preceding embodiment, since $TiO_2$ is not used, the number of film layers is relatively many, but there is a merit of absence of light absorption if excessively irradiated with ultraviolet rays when adhering the prisms.

It can be also applied to other laser wavelength only by changing the film thickness.

In the embodiment, the film composition is as shown in Table 10, but the number of layers and film thickness of each layer are not limited, and for example, in this embodiment, as for $Ta_2O_5$ as shown in Table 10, although layers 11 and 13 were 1.97λ, and other layers were 1.06λ, same performance and reliability were obtained by layers 1 and 3 of 1.97λ, and other layers of 1.06λ.

In this embodiment, the vacuum deposition is employed as film forming method, but it is not limitative, and, for example, sputtering, CVD or sol-gel method may be also employed.

(Embodiment 13)

An embodiment of an optical head using a different beam splitter is described below.

A fabricating method of beam splitter is described.

A glass prism (refractive index 1.51) was set in a vacuum deposition apparatus, and when the degree of vacuum reached $5 \times 10^{-5}$ Torr, a ZnS film (refractive index 2.35) was evaporated by an electron gun, and then an $MgF_2$ film (refractive index 1.38). Similarly, thereafter, a dielectric multi-layer film composed of a total of seven layers was formed by setting each layer in the optical film thickness as shown in Table 11. After forming, the prism was taken out, and it was joined with other prism not forming film, and a beam splitter was fabricated.

TABLE 11

| | Material | Refractive index | Optical film thickness |
|---|---|---|---|
| Layer 1 | ZnS | 2.35 | 1.29λ |
| Layer 2 | $MgF_2$ | 1.38 | 1.29λ |
| Layer 3 | ZnS | 2.35 | 1.29λ |
| Layer 4 | $MgF_2$ | 1.38 | 1.29λ |
| Layer 5 | ZnS | 2.35 | 1.29λ |
| Layer 6 | $MgF_2$ | 1.38 | 1.29λ |
| Layer 7 | ZnS | 2.35 | 1.29λ |

λ = 662 / 4 nm

Figure 22:
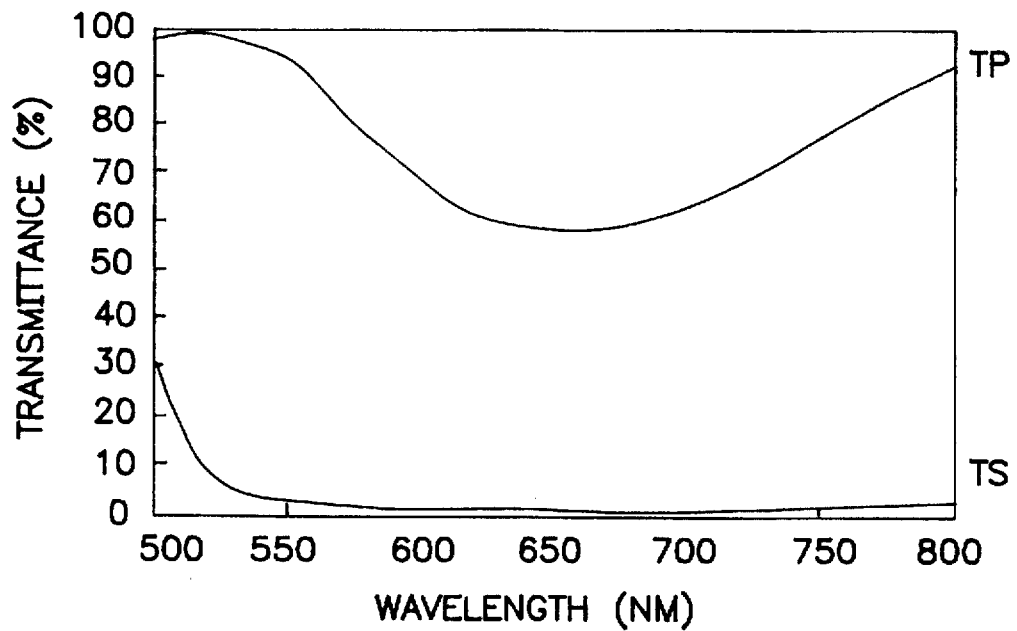
FIG. 22 is a diagram showing the transmittance characteristic of a beam splitter in embodiment 13 of the invention.

The transmission characteristics of the obtained beam splitter are shown in FIG. 22. The characteristics were measured at incident angle of 45°, and TS and TP refer to the transmittance to S and P polarized light.

Thus was obtained a beam splitter having characteristics with S transmittance of 1% (E2 is 0.99) and P transmittance of 59% (E1 is 0.59) at the design wavelength 662 nm. It was also confirmed that the absorption can be ignored in the visible region.

Incorporating the beam splitter of the embodiment in the optical head in the same constitution as in FIG. 1 and studying, a quantity of light sufficient for maintaining the S/N ratio was obtained (about 2.4 times that of half mirror) for the disk fabricated at small birefringence such as high density optical disk. On the other hand, in the compact disc having a large birefringence over the standard, a same quantity of light as in the half mirror was obtained, and a sufficient reproduction output was maintained. At this time, the incident angle of the luminous flux entering the beam splitter from the laser was 45°. It was also confirmed sufficiently allowable for fluctuations of laser wavelength occurring at the time of laser fabrication or fluctuations of characteristic at the time of film forming of about ±20 nm.

In the embodiment, the antireflection film is formed on the laser incident and exit planes of the prism, but if this coating of antireflection film was omitted, although the output was slightly lowered in both high density optical disk and non-standard compact disk, there was no effect on performance.

The fabricated samples were presented for heat shock test (holding at 80° C. and −40° C. for 1 hour each, repeating 10 cycles), high temperature and high humidity test (60° C., 90% RH, 1000 hours), low temperature test (−40° C., 1000 hours), and other reliability tests, and changes of optical characteristics were investigated before and after tests, but no change was detected.

Thus, the practical optical head completely free from problem in performance and reliability was realized.

In the beam splitter of the embodiment, since most reliable film materials such as ZnS and $MgF_2$ are used as optical film material, there is no problem in reliability. Moreover, each layer is equal in optical film thickness, and the film thickness control is very easy, in particular, when an optical monitor is used.

As in the preceding embodiments, since $TiO_2$ is not used, the number of film layers is relatively many, but there is a merit of absence of light absorption if excessively irradiated with ultraviolet rays when adhering the prisms.

It can be also applied to other laser wavelength only by changing the film thickness.

In this embodiment, the vacuum deposition is employed as film forming method, but it is not limitative, and, for example, sputtering, CVD or sol-gel method may be also employed.

(Embodiment 14)

An embodiment of an optical head using other beam splitter is described below.

The fabricating method is same as in embodiment 13, and a dielectric multi-layer film in the composition in Table 12 was fabricated and formed, and the prism was taken out, and it was joined with other prism not forming film, and a beam splitter was fabricated.

TABLE 12

| | Material | Refractive index | Optical film thickness |
|---|---|---|---|
| Layer 1 | ZnS | 2.35 | 1.08λ |
| Layer 2 | $MgF_2$ | 1.38 | 1.65λ |
| Layer 3 | ZnS | 2.35 | 1.08λ |
| Layer 4 | $MgF_2$ | 1.38 | 1.65λ |
| Layer 5 | ZnS | 2.35 | 1.08λ |

λ = 662 / 4 nm

Figure 23:
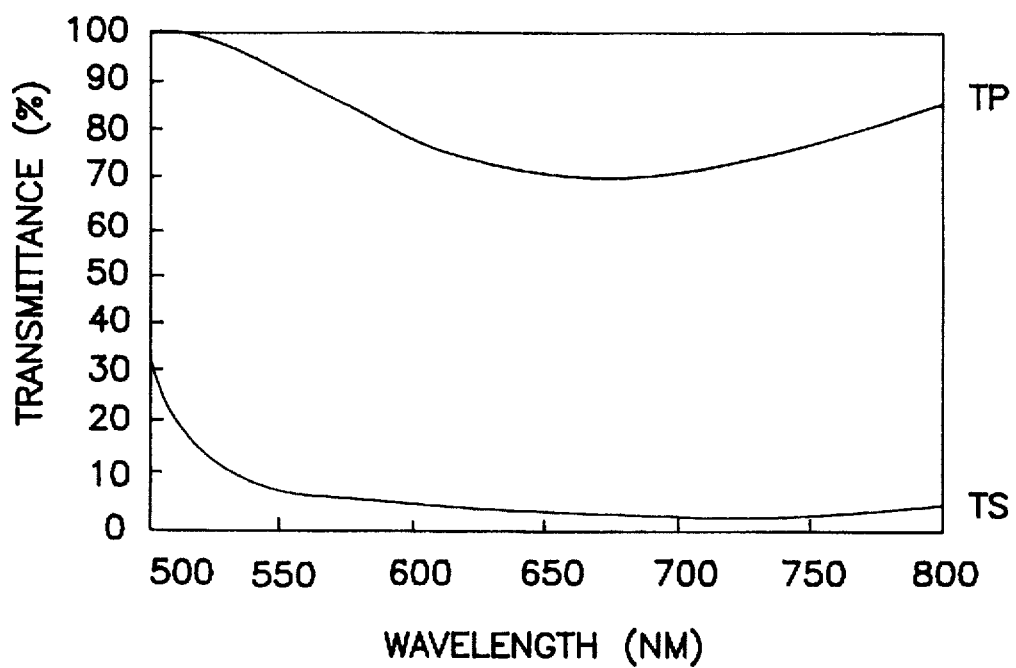
FIG. 23 is a diagram showing the transmittance characteristic of a beam splitter in embodiment 14 of the invention.
Figure 24:
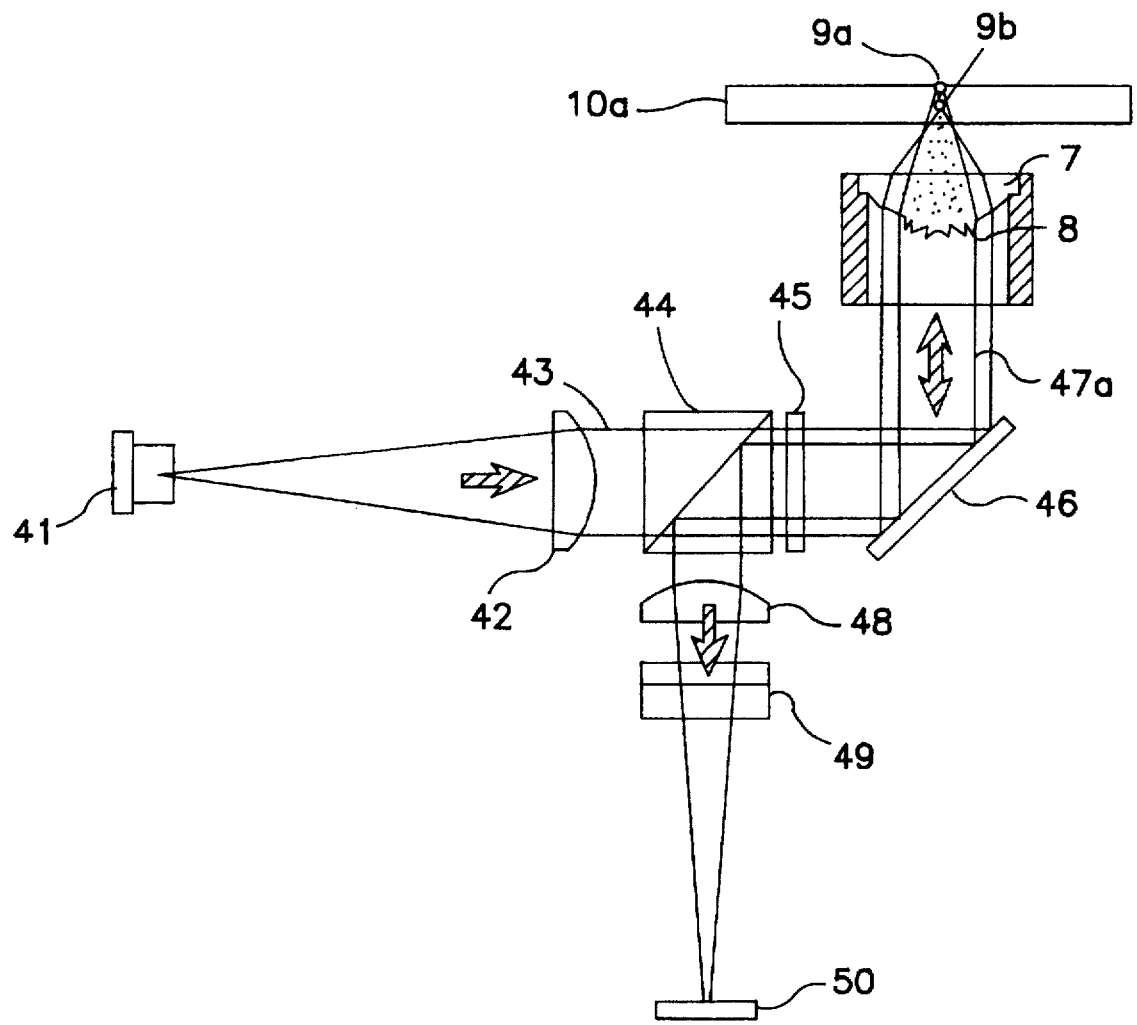
FIG. 24 is a diagram showing a constitution of a conventional optical head.

The transmission characteristics of the obtained beam splitter are shown in FIG. 23. The characteristics were measured at incident angle of 45°, and TS and TP refer to the transmittance to S and P polarized light.

Thus was obtained a beam splitter having flat characteristics with S transmittance of 3% (E2 is 0.97) and P transmittance of 72% (E1 is 0.72) at the design wavelength 662 nm. It was also confirmed that the absorption can be ignored in the visible region.

Incorporating the beam splitter of the embodiment in the optical head in the same constitution as in FIG. 1 and studying, a quantity of light sufficient for maintaining the S/N ratio was obtained (about 3 times that of half mirror) for the disk fabricated at small birefringence such as high density optical disk. On the other hand, in the compact disc having a large birefringence over the standard, a same quantity of light as in the half mirror was obtained, and a sufficient reproduction output was maintained. At this time, the incident angle of the luminous flux entering the beam splitter from the laser was 45°. It was also confirmed sufficiently allowable for fluctuations of laser wavelength occurring at the time of laser fabrication or fluctuations of characteristic at the time of film forming of about ±20 nm.

In the embodiment, the antireflection film is formed on the laser incident and exit planes of the prism, but if this coating of antireflection film was omitted, although the output was slightly lowered in both high density optical disk and non-standard compact disk, there was no effect on performance.

The fabricated samples were presented for heat shock test (holding at 80° C. and −40° C. for 1 hour each, repeating 10 cycles), high temperature and high humidity test (60 C., 90% RH, 1000 hours), low temperature test (−40° C., 1000 hours), and other reliability tests, and changes of optical characteristics were investigated before and after tests, but no change was detected.

Thus, the practical optical head completely free from problem in performance and reliability was realized.

In the beam splitter of the embodiment, since most reliable film materials such as ZnS and $MgF_2$ are used as optical film material, there is no problem in reliability. Besides, since the number of layers is five, and it is easy to manufacture.

As in the preceding embodiments, since $TiO_2$ is not used, the number of film layers is relatively many, but there is a merit of absence of light absorption if excessively irradiated with ultraviolet rays when adhering the prisms.

It can be also applied to other laser wavelength only by changing the film thickness.

In this embodiment, the vacuum deposition is employed as film forming method, but it is not limitative, and, for example, sputtering, CVD or sol-gel method may be also employed.

In the above-mentioned embodiments the E1×E3 is to be such amount that can be detected by the photo detector.

As described herein, the luminous flux splitting means is composed so as to transmit part of polarized light component same as the light from the light source out of reflected luminous flux, and all of polarized light component orthogonal to the light from the light source out of reflected luminous flux, and therefore in the case of an optical disk having a large birefringence such as compact disc, the photo detector can receive light necessary for reproduction, or in the case of a small birefringence such as high density optical disk, almost all reflected light from the optical disk can be received. Therefore, unlike the optical head using half mirror, it is free from the problem of failure of obtaining reproduction output due to decrease in the quantity of light, or unlike the optical head using a polarized light beam splitter, it is free from the problem of failure of reproduction of a disk with a large birefringence. Hence, both high density optical disk and conventional disk can be stably recorded and reproduced by one optical head.

What is claimed is:

1. An optical head comprising:
   a light source,
   luminous flux splitting means for splitting radiation luminous flux of linearly polarized light radiated from the light source into plural luminous fluxes without changing the luminous flux diameter substantially,
   a wavelength plate for polarizing at least one of the luminous fluxes split by the luminous flux splitting means into a nearly circularly polarized light as illumination luminous flux,
   an objective lens for converging the illumination luminous flux through the wavelength plate on an optical information medium and collecting the reflected light, and
   a photo detector for receiving the reflected luminous flux collected by the objective lens, after passing through the wavelength plate and the luminous flux splitting means,
   wherein
   E2×E3 is detectable by the photo detector and E2>E1,
   E2 being a power efficiency when splitting the illumination luminous flux from the radiation luminous flux;
   E2 being a power efficiency when transmitting a polarized light component of the reflected luminous flux to the photodetector, the component being orthogonal to a direction of polarization of the illumination luminous flux; and
   E3 being a power efficiency when transmitting a polarized light component of the reflected luminous flux to the photodetector, the polarized light component having substantially the same direction of polarization as the direction of polarization of the illumination luminous flux.

2. An optical head according to claim 1, wherein E1 is larger that 0.5.

3. An optical head according to claim 2, wherein E3 is larger than 0 and E3 is equal to or smaller than (1−E1).

4. An optical head according to claim 1, wherein the luminous flux splitting means is hologram means.

5. An optical head according to claim 2, wherein the luminous flux splitting means is hologram means.

6. An optical head according to claim 3, wherein the luminous flux splitting means is hologram means.

7. An optical head according to claim 1, wherein said luminous flux splitting means is a beam splitter composed by forming at least one layer of film on a glass substrate.

8. An optical head according to claim 2, wherein said luminous flux splitting means is a beam splitter composed by forming at least one layer of film on a glass substrate.

9. An optical head according to claim 3, wherein said luminous flux splitting means is a beam splitter composed by forming at least one layer of film on a glass substrate.

10. An optical head according to claim 1, wherein said luminous flux splitting means is a beam splitter composed of glass prisms and a layer of film which is disposed closely between the glass prisms.

11. An optical head according to claim 2, wherein said luminous flux splitting means is a beam splitter composed of glass prisms and a layer of film which is disposed closely between the glass prisms.

12. An optical head according to claim 3, wherein said luminous flux splitting means is a beam splitter composed of glass prisms and a layer of film which is disposed closely between the glass prisms.

13. An optical head according to claim 1, wherein said luminous flux splitting means is a beam splitter comprising at least one layer of $TiO_2$ film formed on a glass substrate.

14. An optical head according to claim 1, wherein said luminous flux splitting means is a beam splitter comprising alternating $MgF_2$ film layers and $Al_2O_3$ film layers laminated on a glass substrate.

15. An optical head according to claim 14, wherein said beam splitter comprises ten laminated film layers, alternating $MgF_2$ film in odd-number layers and $Al_2O_3$ film in even-number layers, counting from a side of said glass substrate, each of the first and third through tenth layers having a first optical film thickness, and the second layer having a second optical film thickness substantially twice that of the first optical film thickness.

16. An optical head according to claim 1, wherein said luminous flux splitting means is a beam splitter comprising alternating $SiO_2$ film layers and $Y_2O_3$ film layers laminated on a glass substrate.

17. An optical head according to claim 16, wherein said beam splitter comprises eight laminated film layers, alternating $SiO_2$ film in odd-number layers and $Y_2O_3$ film in even-number layers counting from a side of said glass substrate, each of the first and third through tenth layers having a first optical film thickness, and the second layer having a second optical film thickness substantially twice that of the first optical film thickness.

18. An optical head according to claim 13, wherein said beam splitter further comprises an antireflection film comprising one of a $MgF_2$ film layer sandwiched between two $Al_2O_3$ film layers and an $Al_2O_3$ film layer sandwiched between two $MgF_2$ film layers.

19. An optical head according to claim 14, wherein said beam splitter further comprises an antireflection film comprising one of a $MgF_2$ film layer sandwiched between two $Al_2O_3$ film layers and an $Al_2O_3$ film layer sandwiched between two $MgF_2$ film layers.

20. An optical head according to claim 15, wherein said beam splitter further comprises an antireflection film comprising one of a $MgF_2$ film layer sandwiched between two $Al_2O_3$ film layers and an $Al_2O_3$ film layer sandwiched between two $MgF_2$ film layers.

21. An optical head according to claim 16, wherein said beam splitter further comprises an antireflection film comprising one of a $MgF_2$ film layer sandwiched between two $Al_2O_3$ film layers and an $Al_2O_3$ film layer sandwiched between two $MgF_2$ film layers.

22. An optical head according to claim 17, wherein said beam splitter further comprises an antireflection film comprising one of a $MgF_2$ film layer sandwiched between two $Al_2O_3$ film layers and an $Al_2O_3$ film layer sandwiched between two $MgF_2$ film layers.

23. An optical head according to claim 13, wherein said luminous flux splitting means is a beam splitter comprising:

a first glass prism comprising a multilayer film having alternating laminated $TiO_2$ film layers and $SiO_2$ film layers, and a second glass prism formed on said first glass prism.

24. An optical head according to claim 23, wherein said beam splitter comprises nine laminated film layers, alternating $TiO_2$ film in odd-number layers and $SiO_2$ layer in even-number layers, counting from said glass prism, wherein one of:

each of the second and fourth through ninth layers have a first optical film thickness, and the first and third layers have a second optical film thickness thicker than the first optical film thickness, and each of the first through sixth and eighth layers have the first optical film thickness, and the seventh and ninth layers have the second optical film thickness thicker than the first optical film thickness.

25. An optical head according to claim 13, wherein said luminous flux splitting means is a beam splitter comprising:

a first glass prism comprising a multilayer film having alternating laminated $Ta_2O_5$ film layers and $SiO_2$ film layers, and a second glass prism formed on said first glass prism.

26. An optical head according to claim 13, wherein said luminous flux splitting means is a beam splitter comprising:

a first glass prism comprising a multilayer film having alternating laminated ZnS film layers and $MgF_2$ film layers, and a second glass prism formed on said first glass prism.

* * * * *

UNITED STATES PATENT AND TRADE MARK OFFICE
CERTIFICATE OF CORRECTION

PATENT NO. : 5,790,503
DATED : August 4, 1998
INVENTOR(S) : Mizuno et al.

It is certified that error appears in the above-identified patent and that said Letters Patent is hereby corrected as shown below:

Column 26, line 22, "$E2 \times E3$" should be --$E1 \times E3$--.

Column 26, line 23, "$E2$" should be --$E1$--.

Signed and Sealed this

Second Day of March, 1999

Attest:

Q. TODD DICKINSON

*Attesting Officer*  *Acting Commissioner of Patents and Trademarks*